United States Patent
Kurasawa et al.

(10) Patent No.: US 9,772,701 B2
(45) Date of Patent: Sep. 26, 2017

(54) TOUCH DETECTION DEVICE, AND DISPLAY DEVICE WITH TOUCH DETECTION FUNCTION AND ELECTRONIC APPARATUS INCLUDING THE SAME

(71) Applicant: Japan Display Inc., Tokyo (JP)

(72) Inventors: Hayato Kurasawa, Tokyo (JP); Hiroshi Mizuhashi, Tokyo (JP); Yoshitoshi Kida, Tokyo (JP)

(73) Assignee: Japan Display Inc., Tokyo (JP)

( * ) Notice: Subject to any disclaimer, the term of this patent is extended or adjusted under 35 U.S.C. 154(b) by 324 days.

(21) Appl. No.: 14/160,237

(22) Filed: Jan. 21, 2014

(65) Prior Publication Data

US 2014/0210743 A1 Jul. 31, 2014

(30) Foreign Application Priority Data

Jan. 30, 2013 (JP) ................................. 2013-016233

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0412* (2013.01); *G06F 3/0418* (2013.01)

(58) Field of Classification Search
CPC ........... G06F 3/041; G06F 2203/04103; G06F 2203/04107
See application file for complete search history.

(56) References Cited

U.S. PATENT DOCUMENTS

| 9,035,900 B2* | 5/2015 | Azumi | G06F 3/044 345/174 |
| 2004/0169808 A1* | 9/2004 | Shih | G02F 1/134363 349/141 |
| 2006/0290859 A1* | 12/2006 | Ko | G02F 1/136286 349/139 |
| 2008/0158124 A1* | 7/2008 | Kim | G09G 3/3648 345/92 |
| 2009/0135209 A1* | 5/2009 | Takahashi | 345/690 |
| 2010/0045632 A1* | 2/2010 | Yilmaz | G01D 5/2405 345/174 |
| 2010/0182273 A1* | 7/2010 | Noguchi et al. | 345/174 |

(Continued)

FOREIGN PATENT DOCUMENTS

JP 2012-043298 3/2012

*Primary Examiner* — Ilana Spar
*Assistant Examiner* — Mihir K Rayan
(74) *Attorney, Agent, or Firm* — K&L Gates LLP

(57) ABSTRACT

According to an aspect, a touch detection device has a detection surface for detecting a position of an external proximity object which is in contact therewith or in proximity thereto. The touch detection device includes: a drive electrode layer that has a plurality of drive electrodes; a plurality of touch detection electrodes that face the drive electrodes; a drive electrode driver for applying a driving signal to the drive electrodes; and a plurality of wirings for electrically coupling the plurality of drive electrodes with the drive circuit. In the drive electrode layer, a specific drive electrode coupled via the wiring with a longest distance has an overlapped area smaller than an average of the overlapped areas of the other drive electrodes. The overlapped area is an area that is overlapped with the wiring.

18 Claims, 22 Drawing Sheets

(56) References Cited

U.S. PATENT DOCUMENTS

| | | | |
|---|---|---|---|
| 2010/0231531 A1* | 9/2010 | Yang | G06F 3/044 345/173 |
| 2011/0267295 A1* | 11/2011 | Noguchi et al. | 345/173 |
| 2012/0050193 A1* | 3/2012 | Noguchi | G06F 3/044 345/173 |
| 2012/0262389 A1* | 10/2012 | Kida | G06F 3/0412 345/173 |
| 2013/0081869 A1* | 4/2013 | Kim | G06F 3/044 174/261 |
| 2013/0320346 A1* | 12/2013 | Woo et al. | 257/59 |
| 2013/0329154 A1* | 12/2013 | Yu | G02F 1/133345 349/43 |

* cited by examiner

TOUCH DETECTION DEVICE, AND DISPLAY DEVICE WITH TOUCH DETECTION FUNCTION AND ELECTRONIC APPARATUS INCLUDING THE SAME

CROSS REFERENCES TO RELATED APPLICATIONS

The present application claims priority to Japanese Priority Patent Application JP 2013-016233 filed in the Japan Patent Office on Jan. 30, 2013, the entire content of which is hereby incorporated by reference.

BACKGROUND

1. Technical Field

The present disclosure relates to a touch detection device which can detect an external proximity object, a display device with a touch detection function including the same, and an electronic apparatus.

2. Description of the Related Art

In recent years, display devices with a touch detection function that includes a touch detection device configured to detect proximity operation with an external proximity object such as a finger and a stylus pen are well known. The display devices with a touch detection function are called touch panels. Such display devices include, in addition to a type of the display devices in which a touch detection unit is mounted on a display device such as a liquid crystal display device, a type of the display devices in which a touch detection unit is integrated with a display device such as a liquid crystal display device.

Several detection methods are known for the touch detection devices, including optical detection method, resistance-type detection method, and capacitance-type detection method. Among these, the capacitance-type detection method allows fabrication of the touch detection devices with a relatively simple configuration and enables the device to be driven with low power consumption. Display device with a touch detection function including such a touch detection device allows the user to input desired information through a touch detection unit, in a similar manner as in the case of using general mechanical buttons, by displaying various kinds of button images on the display device and allowing the user to perform a proximity operation for the display device with an external proximity object. Unlike an input device, such as a keyboard device, a mouse device, and a keypad which are externally coupled to a display device, the touch detection device can be provided substantially integrally with the display device. Accordingly, the touch detection device is provided in various electronic apparatuses, such as mobile phones, television receivers, digital cameras, note-type personal computers, and the like.

The capacitance-type touch detection device includes a first wiring and a second wiring which are stacked. A voltage is applied to one (drive electrodes) of the wirings, and a detection signal is detected in the other wiring (touch detection electrodes) (see Japanese Patent Application Laid-open Publication No. 2012-43298 (JP-A-2012-43298)). In the capacitance-type touch detection device, when an external proximity object is in proximity to a detection region where detection is performed with the drive electrode and the touch detection electrode, the value of a signal detected in the touch detection electrode changes. Based on the change, the capacitance-type touch detection device detects proximity of the external proximity object. It is also described in JP-A-2012-43298 that the width of pad portions at the end of the drive electrodes are varied depending on positions.

The touch detection device has a plurality of drive electrodes arranged so as to be adjacent to each other in a specified direction (array direction). In other words, the touch detection device has a plurality of drive electrodes juxtaposed in the array direction. To detect a touch, the touch detection device switches the drive electrode to which a voltage is applied in a time division manner, and detects signals through touch detection electrodes at each detection timing. Consequently, when a touch is performed in a region where one drive electrode is arranged, the touch is detected as a change in signals of touch detection electrodes which overlap with the one drive electrode in the vicinity of the touch position.

In the touch detection device, a drive circuit which supplies a driving signal is coupled with each of the drive electrodes via wiring. Since each of the drive electrodes is arranged in parallel, a distance between each of the drive electrodes and the drive circuit is different. Accordingly, a wiring length between each of the drive electrodes and the drive circuit also varies.

Each of the drive electrodes has a wiring resistance value which varies depending on the length of the wiring coupled with the drive circuit. More specifically, the wiring resistance value is larger as the length of the wiring coupled with the drive circuit is longer. A drive electrode which is coupled with a longer wiring has a larger wiring resistance value. The larger wiring resistance value leads to a larger time constant, so that the time taken from reception of a driving signal to attainment of a predetermined level becomes longer.

In designing a system of the touch detection device, a touch detection period, i.e., the time taken for applying a driving signal to each electrode, may be set on the basis of the time taken for a driving signal, which is supplied to the drive electrode having a largest time constant, to attain a predetermined level. Accordingly, as a difference in time constant between the drive electrode having a large time constant and other drive electrodes becomes larger, reduction in touch detection period becomes difficult.

For the foregoing reasons, there is a need for a touch detection device capable of reducing touch detection time in each drive electrode, and a display device with a touch detection function and an electronic apparatus including the same.

SUMMARY

According to an aspect, a touch detection device is configured to be stacked on a display device, which has a plurality of scanning signal lines and a plurality of pixel signal lines and displays an image on a display area, and to detect a position of an external proximity object which is in contact with or in proximity to a detection surface. The touch detection device includes: a drive electrode layer that has a plurality of drive electrodes each arranged at a position that overlaps with at least one of the scanning signal lines and the pixel signal lines in a direction orthogonal to the detection surface; a plurality of touch detection electrodes that face the drive electrodes to form capacitance between the drive electrodes and the touch detection electrodes; a drive electrode driver for applying a driving signal to the drive electrodes; and a plurality of wirings for electrically coupling the plurality of drive electrodes with the drive circuit. In the drive electrode layer, among the plurality of drive electrodes, a specific drive electrode coupled via the wiring with a longest distance has an overlapped area smaller than an average of the overlapped areas of the other drive electrodes. The overlapped area is an area that is overlapped with at least one of the scanning signal lines and the pixel signal lines.

According to another aspect, a display device with a touch detection function has a display area for displaying an image and a detection surface for detecting a position of an external proximity object which is in contact therewith or in proximity thereto. The display device with a touch detection function includes: a plurality of scanning signal lines for supplying a scanning signal to the display area; a plurality of pixel signal lines for supplying a pixel signal to the display area; a drive electrode layer that has a plurality of drive electrodes each arranged at a position that overlaps with at least one of the scanning signal lines and the pixel signal lines in a direction orthogonal to the detection surface; a plurality of touch detection electrodes that face the drive electrodes to form capacitance between the drive electrodes and the touch detection electrodes; a drive electrode driver for applying a driving signal to the drive electrodes; and a plurality of wirings for electrically coupling the plurality of drive electrodes with the drive circuit. In the drive electrode layer, among the plurality of drive electrodes, a specific drive electrode coupled via the wiring with a longest distance has an overlapped area smaller than an average of the overlapped areas of the other drive electrodes. The overlapped area is an area that is overlapped with at least one of the scanning signal lines and the pixel signal lines.

According to another aspect, an electronic apparatus includes the display device with a touch detection function.

Additional features and advantages are described herein, and will be apparent from the following Detailed Description and the figures.

DETAILED DESCRIPTION

Figure 1:
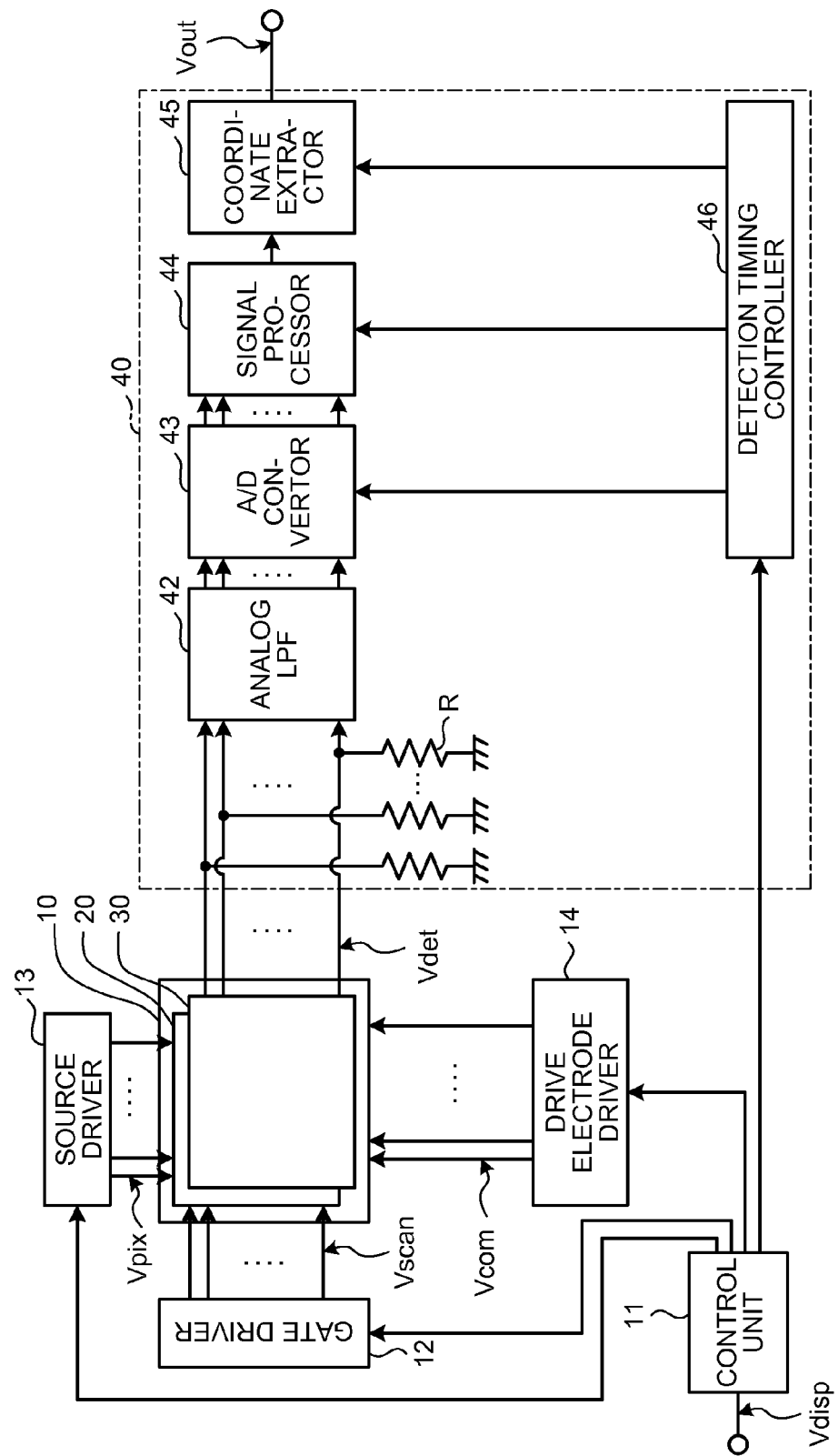
FIG. 1 is a block diagram illustrating one configuration example of a display device with a touch detection function according to a first embodiment.

Embodiments will be described in detail with reference to the drawings. It should be understood that the present disclosure is not limited by the details of the embodiments described below. Constituent elements described hereinbelow include those easily conceived of by a person skilled in the art and those substantially identical thereto. Further, the constituent elements described hereinbelow can be appropriately combined as necessary. A description will be given in the order shown below:

1. Embodiments (display devices with touch detection function)
   1-1. First embodiment
   1-2. Second embodiment
   1-3. Third embodiment
   1-4. Fourth embodiment
   1-5. Fifth embodiment
   1-6. Sixth embodiment
   1-7. Modifications
2. Application examples (electronic apparatuses)
   Examples of electronic apparatuses to which the display devices with a touch detection function according to any one of the embodiments is applied
3. Aspects of present disclosure 1. Embodiments 1-1 First Embodiment 1-1A. Configuration Example Overall Configuration Example FIG. 1 is a block diagram illustrating one configuration example of a display device with a touch detection function 1 according to a first embodiment. The display device with a touch detection function 1 includes a display unit with a touch detection function 10, a control unit 11, a gate driver 12, a source driver 13, a drive electrode driver 14, and a touch detection unit 40. The display device with a touch detection function 1 is a display device in which a display unit with a touch detection function 10 is integrated with a touch detection function. The display unit with a touch detection function 10 is what is called an in-cell type device made by integrating a liquid crystal display device (display device) 20 which uses liquid crystal display elements as the display elements and a capacitance-type touch detection device (touch detection device) 30. The display unit with a touch detection function 10 may be so-called an on-cell type device made by mounting the capacitance-type touch detection device 30 on the liquid crystal display unit 20 which uses liquid crystal display elements as the display elements.

The liquid crystal display unit 20 is a device which performs display by sequentially scanning the horizontal lines one by one in accordance with a scanning signal Vscan supplied from the gate driver 12 as described later. The control unit 11 is a circuit which supplies a control signal to each of the gate driver 12, the source driver 13, the drive electrode driver 14, and the touch detection unit 40 based on a video signal Vdisp supplied from the outside to control so that these constituent elements operate in synchronization with each other.

The gate driver 12 has a function to sequentially select one horizontal line, which is a display driving target of the display unit with a touch detection function 10, based on the control signal supplied from the control unit 11.

The source driver 13 is a circuit which supplies a pixel signal Vpix to each of later-described pixels Pix (sub-pixels SPix) in the display unit with a touch detection function 10 based on the control signal supplied from the control unit 11. The source driver 13 generates a pixel signal by time-divisionally multiplexing the pixel signals Vpix of the plurality of sub-pixels SPix in the liquid crystal display unit 20, from a video signal of one horizontal line.

The drive electrode driver 14 is a circuit which supplies a driving signal Vcom to later-described drive electrodes COML in the display unit with a touch detection function 10 based on the control signal supplied from the control unit 11.

Basic Principle of Capacitance-Type Touch Detection

Figure 2:
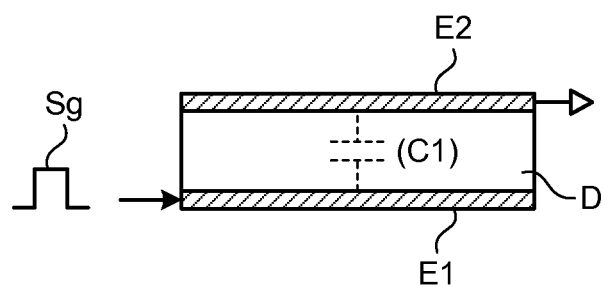
FIG. 2 is an explanatory view illustrating the state where a finger is neither in contact with nor in proximity to the device to describe the basic principle of the capacitance-type touch detection method.
Figure 3:
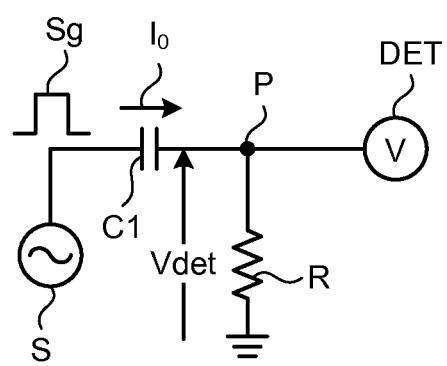
FIG. 3 is an explanatory view illustrating an example of an equivalent circuit in the state illustrated in FIG. 2 where the finger is neither in contact with nor in proximity to the device.
Figure 4:
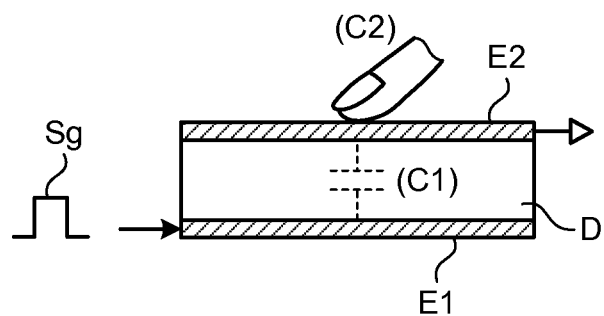
FIG. 4 is an explanatory view illustrating a state where a finger is in contact with or in proximity to the device to describe the basic principle of the capacitance-type touch detection method.
Figure 5:
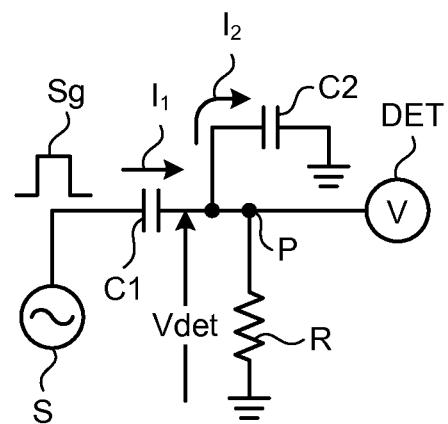
FIG. 5 is an explanatory view illustrating an example of the equivalent circuit in the state illustrated in FIG. 4 where a finger is in contact with or in proximity to the device.
Figure 6:
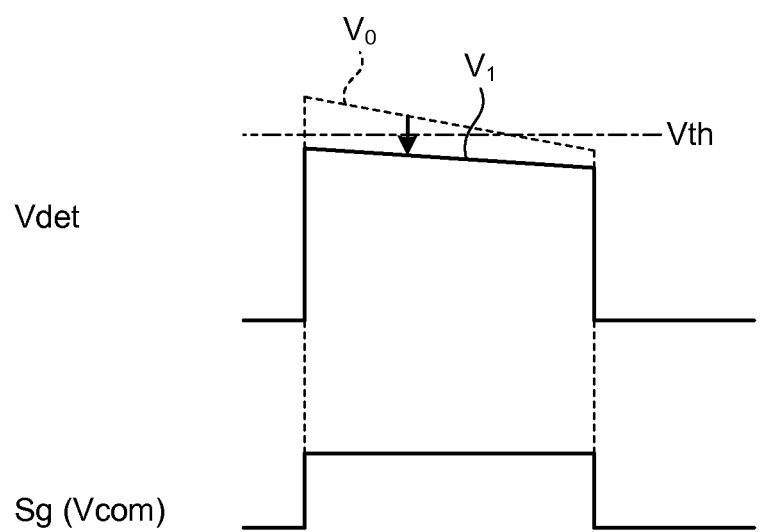
FIG. 6 illustrates one example of waveforms of a driving signal and a touch detection signal.

The touch detection device 30 operates based on the basic principle of capacitance-type touch detection, and outputs a touch detection signal Vdet. With reference to FIGS. 1 to 6, the basic principle of touch detection in the display device with a touch detection function 1 of the present embodiment will be described. FIG. 2 is an explanatory view illustrating the state where a finger is neither in contact with nor in proximity to the device to describe the basic principle of the capacitance-type touch detection method. FIG. 3 is an explanatory view illustrating an example of an equivalent circuit in the state illustrated in FIG. 2 where a finger is neither in contact with nor in proximity to the device. FIG. 4 is an explanatory view illustrating the state where a finger is in contact with or in proximity to the device to describe the basic principle of the capacitance-type touch detection method. FIG. 5 is an explanatory view illustrating an example of the equivalent circuit in the state illustrated in FIG. 4 where a finger is in contact with or in proximity to the device. FIG. 6 illustrates one example of waveforms of a driving signal and a touch detection signal.

For example, as illustrated in FIGS. 2 and 4, a capacitive element C1 includes a drive electrode E1 and a touch detection electrode E2 which are a pair of electrodes arranged so as to face each other with a dielectric D interposed therebetween. As illustrated in FIGS. 3 and 5, one end of the capacitative element C1 is coupled to an AC signal source (driving signal source) S while the other end P is grounded via a resistance R and is also coupled to a voltage detector (touch detection unit) DET.

When an AC rectangular wave Sg of a specified frequency (for example, about several kHz to several hundreds of kHz) is applied to the drive electrode E1 (one end of the capacitative element C1) from the AC signal source S, an output waveform (touch detection signal Vdet) appears in the touch detection electrode E2 (the other end P of the capacitative element C1). The AC rectangular wave Sg is equivalent to a later-described touch driving signal Vcomt.

In the state (noncontact state) where a finger is not in contact with (or in proximity to) the device, charge to and discharge from the capacitative element C1 cause a current $I_0$, corresponding to the capacitance value of the capacitative element C1, to flow as illustrated in FIGS. 2 and 3. In this case, the other end P of the capacitative element C1 has a potential waveform like, for example, a waveform $V_0$ illustrated in FIG. 6, and the voltage detector DET illustrated in FIG. 3 detects the waveform $V_0$.

In the state (contact state) where a finger is in contact with (or in proximity to) the device, capacitance generated by the finger acts as if it was a capacitative element C2 so that the capacitative element C2 is added to the capacitative element C1 as illustrated in FIG. 4. With reference to the equivalent circuit illustrated in FIG. 5, the capacitative element C2 is added to the capacitative element C1 in series. In this state, charge to and discharge from the capacitative elements C1 and C2 cause currents $I_1$ and $I_2$ to flow into the capacitative elements C1 and C2. In this case, the other end P of the capacitative element C1 has a potential waveform like, for example, a waveform $V_1$ illustrated in FIG. 6, and the voltage detector DET detects the waveform $V_1$. At this time, the potential of the other end P is a voltage-divided potential which is determined by the values of the currents $I_1$ and $I_2$ flowing through the capacitative elements C1 and C2. Accordingly, the waveform $V_1$ is a value smaller than the waveform $V_0$ in the noncontact state. The voltage detector DET compares the detected voltage with a specified threshold voltage Vth. If the detected voltage is equal to or more than the threshold voltage Vth, the device is determined to be in a noncontact state, whereas if the detected voltage is less than the threshold voltage Vth, the device is determined to be in a contact state. Thus, touch detection can be implemented.

The touch detection device 30 illustrated in FIG. 1 is configured to perform touch detection by sequentially scanning detection blocks one by one in accordance with a driving signal Vcom (later-described touch driving signal Vcomt) supplied from the drive electrode driver 14.

The touch detection device 30 is configured to output touch detection signals Vdet from a plurality of later-described touch detection electrodes TDL for each detection block, and supplies the touch detection signals Vdet to the touch detection unit 40.

The touch detection unit 40 is a circuit which detects the presence or absence of a touch (aforementioned contact state) with respect to the touch detection device 30 based on the control signal supplied from the control unit 11 and the touch detection signals Vdet supplied from the touch detection device 30 in the display unit with a touch detection function 10. If the touch is present, the touch detection unit 40 obtains coordinates of a touch detection region. The touch detection unit 40 includes an analog low-pass filter (LPF) 42, an A/D convertor 43, a signal processor 44, a coordinate extractor 45, and a detection timing controller 46.

The analog LPF 42 is a low-pass analog filter configured to receive an input of the touch detection signals Vdet supplied from the touch detection device 30, remove a high frequency component (noise component) contained in each of the touch detection signals Vdet, and to take out and output a touch component of each signal. A resistance R for providing a DC potential (0 V) is coupled to between each input terminal of the analog LPF 42 and the ground. The resistance R may be replaced with, for example, a switch. The DC potential (0 V) may be provided by turning on the switch at specified time.

The A/D convertor 43 is a circuit which samples each of the analog signals outputted from the analog LPF 42 and converts them into digital signals in a timing synchronous with the driving signal Vcom.

Each of the output signals of the A/D convertor 43 contains a frequency component (noise components) whose frequency is higher than the sampling frequency of the touch driving signal Vcomt. The signal processor 44 has a digital filter for removing the frequency component and takes out a touch component. The signal processor 44 is a logic circuit which detects presence or absence of a touch with respect to the touch detection device 30 based on the output signals of the A/D convertor 43.

The coordinate extractor 45 is a logic circuit which obtains touch panel coordinates when the touch is detected in the signal processor 44. The detection timing controller 46 performs control so that the A/D convertor 43, the signal processor 44, and the coordinate extractor 45 operate in synchronization.

Module

Figure 7:
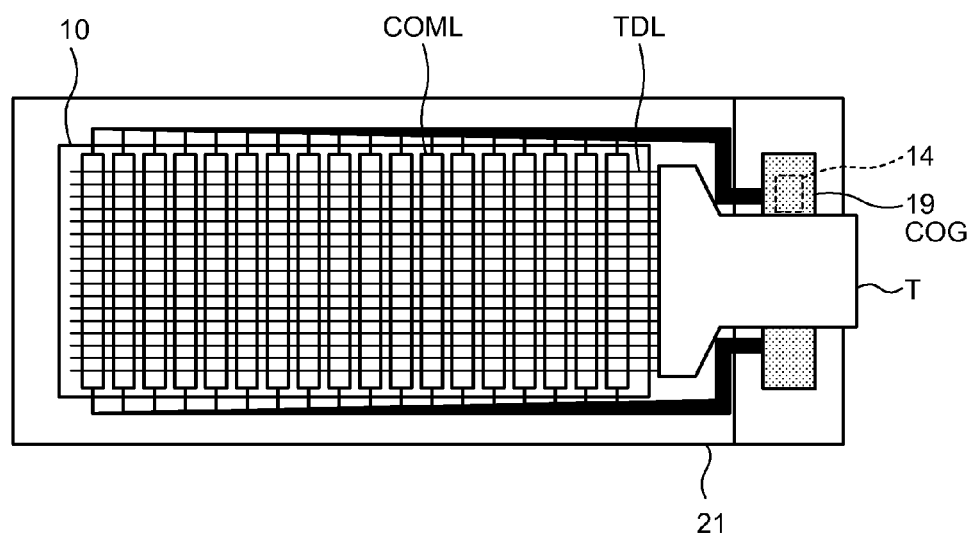
FIG. 7 illustrates one example of a module on which a display device with a touch detection function is mounted.

FIG. 7 illustrates one example of a module on which the display device with a touch detection function 1 is mounted. As illustrated in FIG. 7, the display device with a touch detection function 1 includes a display unit with a touch detection function 10 and a chip-on glass (COG) 19. The COG 19 incorporates a drive electrode driver 14. The display unit with a touch detection function 10 is what is called a landscape-type (oblong) device. The display unit with a touch detection function 10 is schematically illustrated so as to include drive electrodes COML, and touch detection electrodes TDL which are formed to intersect with the drive electrodes COML in a vertical direction with respect to the surface of a later-described TFT substrate 21. That is, the drive electrodes COML are formed along a short side direction of the display unit with a touch detection function 10, while the touch detection electrodes TDL are formed along a long side direction of the display unit with a touch detection function 10. The display unit with a touch detection function 10 has the plurality of drive electrodes COML arranged in lines along the long side direction. The display unit with a touch detection function 10 has the plurality of drive electrodes COML arranged on the same plane. In the display unit with a touch detection function 10, an area where the plurality of drive electrodes COML are arranged forms a drive electrode layer. The display unit with a touch detection function 10 has the plurality of touch detection electrodes TDL arranged in lines along the short side direction. The display unit with a touch detection function 10 has the plurality of touch detection electrodes TDL arranged on the same plane. In the display unit with a touch detection function 10, an area where the plurality of touch detection electrodes TDL are arranged forms a touch detection electrode layer. The drive electrode layer and the touch detection electrode layer are arranged to cover at least the entire region which displays an image. Outputs of the touch detection electrodes TDL are provided on the short side of the display unit with a touch detection function 10. The outputs of the touch detection electrodes TDL are coupled to the touch detection unit 40 mounted in the outside of the module via a terminal unit T which is arranged on the short side of the display unit with a touch detection function 10 and is composed of a flexible board and the like. The COG 19, which is a chip mounted on the TFT substrate 21, incorporates the circuits which are necessary for display operation, such as the control unit 11, the gate driver 12, and the source driver 13 illustrated in FIG. 1. The drive electrode driver 14 incorporated in the COG 19 applies a driving signal to the drive electrodes COML under the control of the COG 19.

The display device with a touch detection function 1 performs line sequential scanning of horizontal lines one by one for display operation as described later. At the time of touch detection operation, the display device with a touch detection function 1 applies a driving signal Vcom to the drive electrodes COML in sequence so as to perform line sequential scanning of detection lines one by one.

Thus, the display device with a touch detection function 1 illustrated in FIG. 7 outputs touch detection signals Vdet from the short side of the display unit with a touch detection function 10. As a consequence, the display device with a touch detection function 1 can decrease the number of the touch detection electrodes TDL, and facilitate routing of wirings for coupling the touch detection electrodes TDL with the touch detection unit 40 via the terminal unit T. Since the display device with a touch detection function 1 illustrated in FIG. 7 has the drive electrode driver 14 incorporated in the COG 19, a frame regions can be narrowed.

Display Unit with a Touch Detection Function 10

A configuration example of the display unit with a touch detection function 10 will be described in detail.

Figure 8:
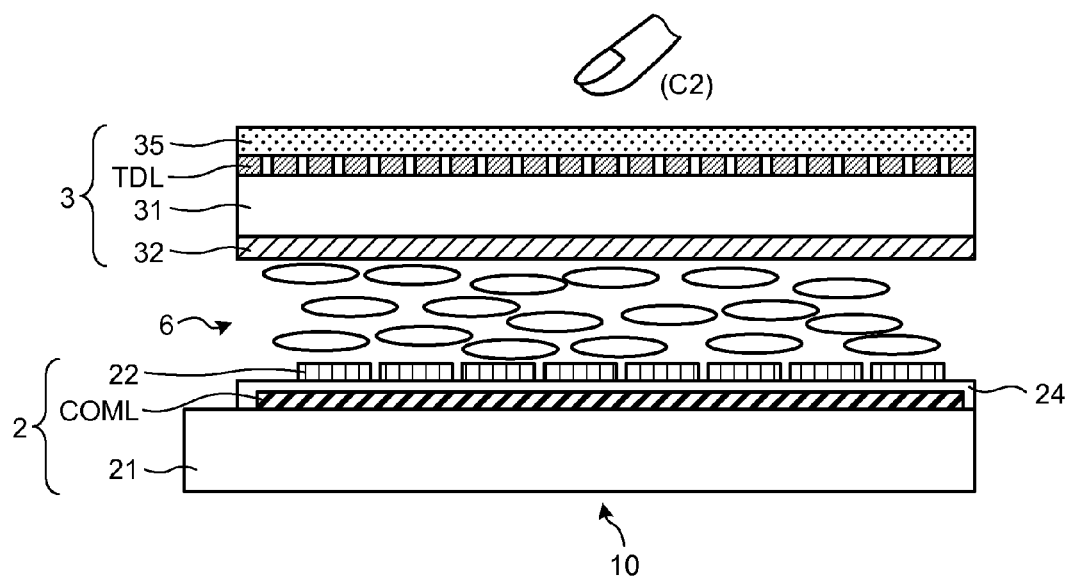
FIG. 8 is a cross sectional view illustrating a schematic cross sectional configuration of the display device with a touch detection function according to the first embodiment.
Figure 9:
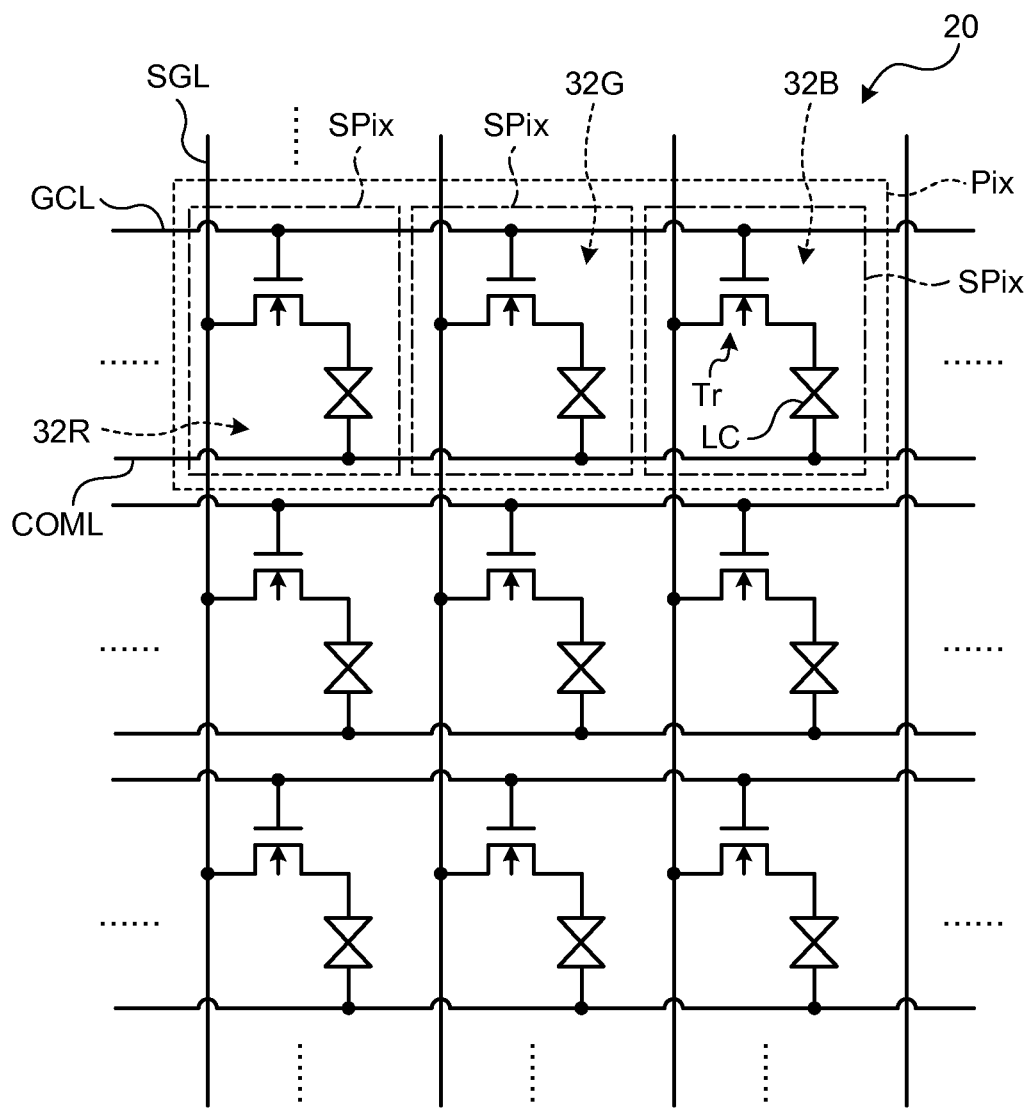
FIG. 9 is a circuit diagram illustrating a pixel array of the display device with a touch detection function according to the first embodiment.

FIG. 8 is a cross sectional view illustrating a schematic cross sectional configuration of the display device with a touch detection function according to the first embodiment. FIG. 9 is a circuit diagram illustrating a pixel array of the display device with a touch detection function according to the first embodiment. The display unit with a touch detection function 10 includes a pixel substrate 2, a counter substrate 3 arranged so as to face the surface of the pixel substrate 2 in a direction perpendicular to a surface thereof, and a liquid crystal layer 6 interposed between the pixel substrate 2 and the counter substrate 3.

The pixel substrate 2 includes a TFT substrate 21 as a circuit board, a plurality of pixel electrodes 22 provided in a matrix form above the TFT substrate 21, the plurality of drive electrodes COML formed between the TFT substrate 21 and the pixel electrodes 22, and an insulating layer 24 which insulates between the pixel electrodes 22 and the drive electrodes COML. Formed above the TFT substrate 21 are thin-film transistor (TFT) elements Tr for respective sub-pixels SPix illustrated in FIG. 9, and wirings such as pixel signal lines SGL which supply a pixel signal Vpix to each of the pixel electrodes 22 and scanning signal lines GCL which supply a scanning signal for driving each of the TFT elements Tr. Thus, the pixel signal lines SGL extend on a plane parallel to the surface of the TFT substrate 21 and supply a pixel signal for displaying an image to the pixel. The liquid crystal display unit 20 illustrated in FIG. 9 has a plurality of sub-pixels SPix arrayed in a matrix form. Each of the sub-pixels SPix includes a TFT element Tr and a liquid crystal element LC. The TFT element Tr is formed of a thin-film transistor. In this example, the TFT element Tr is formed of an n-channel metal oxide semiconductor (MOS) TFT. The source of the TFT element Tr is coupled to a pixel signal line SGL, the gate is coupled to a scanning signal line GCL, and the drain is coupled to one end of the liquid crystal element LC. One end of the liquid crystal element LC is coupled to the drain of the TFT element Tr, while the other end is coupled to the drive electrode COML.

The sub-pixels SPix belonging to the same row in the liquid crystal display unit 20 are coupled with each other through one of the scanning signal lines GCL. Each of the scanning signal lines GCL is coupled with the gate driver 12, and supplied with a scanning signal Vscan by the gate driver 12. The sub-pixels SPix belonging to the same column in the liquid crystal display unit 20 are coupled with each other through one of the pixel signal lines SGL. Each of the pixel signal lines SGL is coupled with the source driver 13, and supplied with a pixel signal Vpix by the source driver 13. Further, the sub-pixels SPix belonging to the same row in the liquid crystal display unit 20 are coupled with each other through one of the drive electrodes COML. Each of the drive electrodes COML is coupled with the drive electrode driver 14, and supplied with a driving signal Vcom by the drive electrode driver 14. In other words, the plurality of sub-pixels SPix belonging to the same row share one drive electrode COML in this example.

The gate driver 12 illustrated in FIG. 1 applies a scanning signal Vscan to the gates of the TFT elements Tr of the sub-pixels SPix via each of the scanning signal lines GCL illustrated in FIG. 9. As a result, the gate driver 12 sequentially selects one row (one horizontal line) out of the sub-pixels SPix formed in a matrix form in the liquid crystal display unit 20 as a display driving target. The source driver 13 illustrated in FIG. 1 supplies a pixel signal Vpix to each of the sub-pixels SPix constituting one horizontal line, which is sequentially selected by the gate driver 12, via the pixel signal lines SGL illustrated in FIG. 9. In these sub-pixels SPix, one horizontal line is displayed in response to the supplied pixel signal Vpix. The drive electrode driver 14 illustrated in FIG. 1 applies a driving signal Vcom and drives a drive electrode COML corresponding to one horizontal line illustrated in FIGS. 8 and 9.

As described in the foregoing, in the liquid crystal display unit 20, the gate driver 12 drives the scanning signal lines GCL to perform line sequential scanning in a time division manner. As a result, horizontal lines are sequentially selected one by one. Further, in the liquid crystal display unit 20, the source driver 13 supplies a pixel signal Vpix to each of the pixels Pix which belong to one horizontal line. As a result, horizontal lines are displayed one by one. When the display operation is performed, the drive electrode driver 14 is configured to apply a driving signal Vcom to a block including a drive electrode COML corresponding to the one horizontal line.

The counter substrate 3 includes a glass substrate 31 and a color filter 32 formed on one surface of the glass substrate 31. The touch detection electrodes TDL that are the detection electrodes of the touch detection device 30 are formed on the other surface of the glass substrate 31. A polarizing plate 35 is provided on the touch detection electrodes TDL.

The color filter 32 includes color regions 32R, 32G, and 32B colored in three colors of red (R), green (G) and blue (B). In the direction perpendicular to the TFT substrate 21, the color filter 32 faces the pixel electrodes 22 and overlaps with the surface of the TFT substrate 21 in the direction perpendicular to the TFT substrate 21. For example, the color filter 32 is made by periodically arraying color filters colored in three colors of red (R), green (G) and blue (B). The color regions 32R, 32G, and 32B which are colored in three colors of red (R), green (G) and blue (B) are associated with sub-pixels SPix illustrated in FIG. 9, respectively. Further, sets of the color region 32R, the color region 32G, and the color region 32B are associated with pixels Pix, respectively. The color filter 32 faces the liquid crystal layer 6 in the direction perpendicular to the TFT substrate 21. The color combination of the color filter 32 may be other combinations if the filters are colored in different colors.

The drive electrodes COML according to the present embodiment function as common electrodes (common drive electrodes) of the liquid crystal display unit 20 and also function as drive electrodes of the touch detection device 30. In the present embodiment, the drive electrodes COML are arranged in such a manner that one drive electrode COML corresponds to the pixel electrodes 22 of a plurality of horizontal lines (pixel electrodes 22 constituting a plurality of lines). The insulating layer 24 insulates between the pixel electrodes 22 and the drive electrodes COML, and also insulates between the pixel electrodes 22 and the pixel signal lines SGL formed above the surface of the TFT substrate 21. In the direction perpendicular to the surface of the TFT substrate 21, the drive electrodes COML face the pixel electrodes 22 and extend in the direction parallel to the direction where the aforementioned scanning signal lines GCL extend.

The liquid crystal layer 6 modulates the light that passes therethrough in accordance with the state of electric fields thereof. For example, a liquid crystal display device using liquid crystal of a transverse electric field mode, such as a fringe field switching (FFS) mode and an in-plane switching (IPS) mode, is used as the liquid crystal layer 6. An orienting film may be provided each of between the liquid crystal layer 6 and the pixel substrate 2 illustrated in FIG. 8 and between the liquid crystal layer 6 and the counter substrate 3.

The orienting film may be provided each of between the liquid crystal layer 6 and the pixel substrate 2 and between the liquid crystal layer 6 and the counter substrate 3. Further, an incident polarizing plate may be arranged on the lower surface side of the pixel substrate 2.

Figure 10:
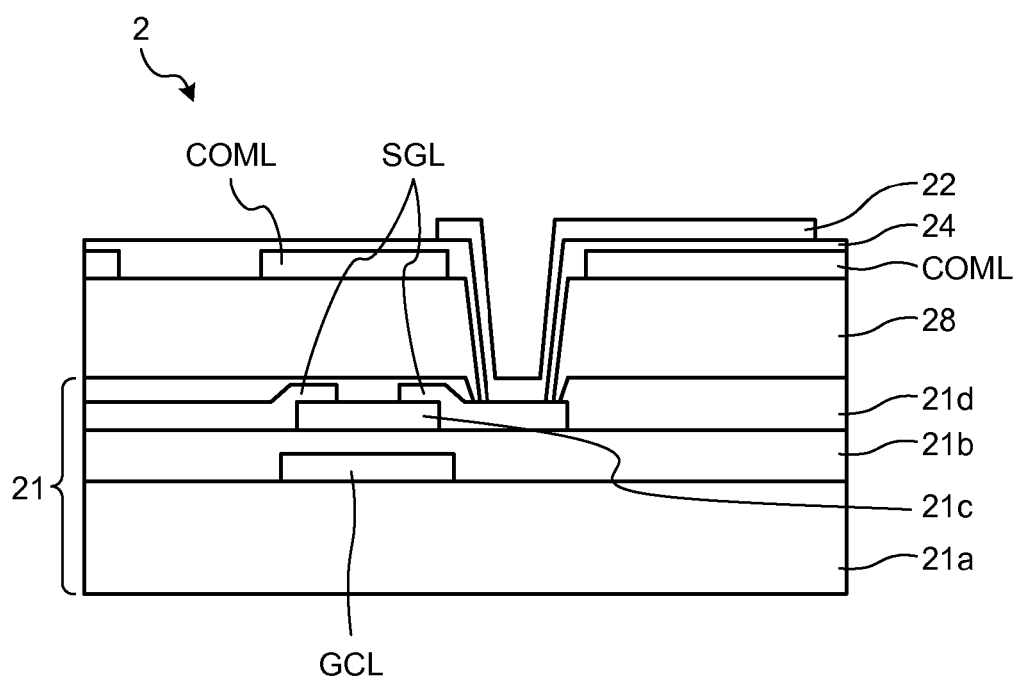
FIG. 10 is a partially enlarged cross sectional view illustrating a portion corresponding to one sub-pixel of a pixel substrate in the display device with a touch detection function according to the first embodiment.

FIG. 10 is a partially enlarged cross sectional view illustrating a portion corresponding to one sub-pixel of the pixel substrate. As illustrated in FIG. 10, the pixel substrate 2 of the display unit with a touch detection function 10 is formed by stacking the drive electrode COML, the insulating layer 24, and the pixel electrode 22 above the TFT substrate 21. An insulating layer 28 is arranged between the surface of the TFT substrate 21 and the drive electrode COML. The insulating layer 28 is formed of an insulating organic substance, such as acrylic resin, which can be stacked high in a short time. In the TFT substrate 21, the scanning signal line GCL, an insulating film 21b, a semiconductor 21c, the pixel signal line SGL, and an insulating film 21d are stacked on a glass substrate 21a having transparency. The semiconductor 21c is stacked above the scanning signal line GCL via the insulating film 21b. The semiconductor 21c is coupled with the pixel signal line SGL. When the pixel substrate 2 is viewed from a direction opposite to the surface thereof, part of the drive electrode COML overlaps with the scanning signal line GCL and the pixel signal line SGL. In other words, in the pixel substrate 2, the drive electrode COML, the scanning signal line GCL, and the pixel signal line SGL are stacked in a direction orthogonal to the surface via the insulating layers. The drive electrode COML is formed on the plane parallel to the surface of the pixel substrate 2, and a formation portion thereof includes a region which overlaps with the scanning signal line GCL and the pixel signal line SGL.

Figure 11:
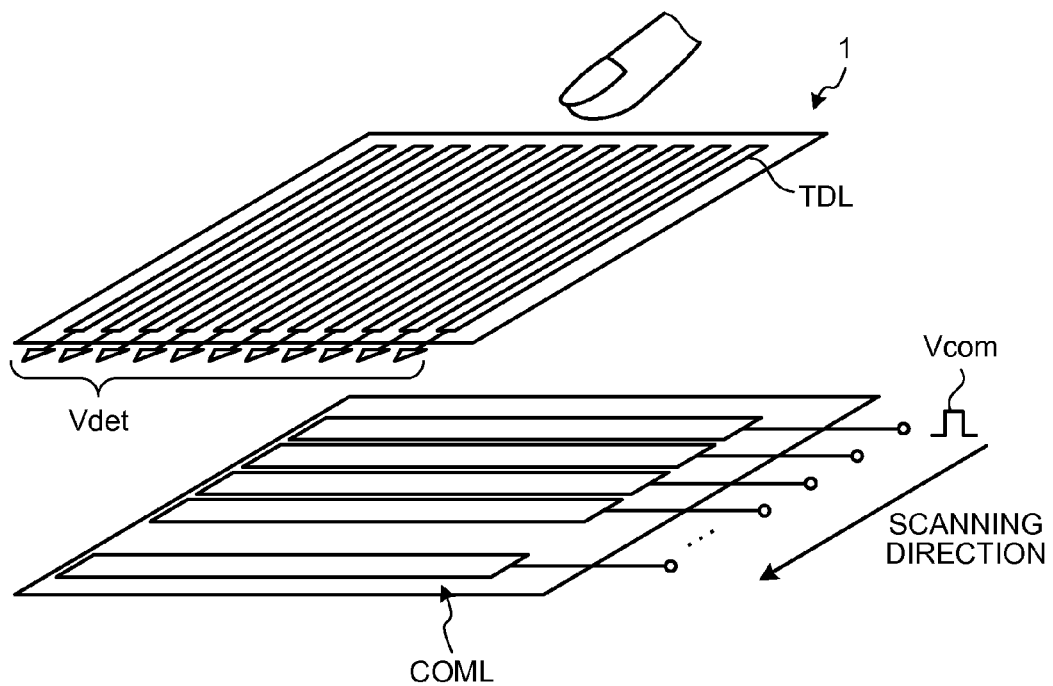
FIG. 11 is a perspective view illustrating one configuration example of drive electrodes and touch detection electrodes in the display device with a touch detection function according to the first embodiment.

FIG. 11 is a perspective view illustrating one configuration example of the drive electrodes and the touch detection electrodes in the display device with a touch detection function according to the first embodiment. The touch detection device 30 includes the drive electrodes COML and the touch detection electrodes TDL. As described above, the drive electrodes COML are arranged so as to extend in a left and right direction in the drawing in a stripe shape (strip electrode pattern). As described above, in the touch detection device 30, the plurality of drive electrodes COML are arranged in lines so as to be adjacent to each other in an up and down direction in the drawing. In the touch detection device 30, the drive electrodes COML arranged in lines divide a touch detection region into a plurality of subregions. When touch detection operation is performed, a driving signal Vcom is sequentially supplied to each of the drive electrodes COML by the drive electrode driver 14, so that sequential scanning and driving are performed in a time division manner as described later. The touch detection electrodes TDL are arranged in a stripe shape (stripe electrode pattern) extending in a direction intersecting the extending direction of the drive electrodes COML. As described above, in the touch detection device 30, the plurality of touch detection electrodes TDL are arranged in lines so as to be adjacent to each other in the left and right direction in the drawing. In the touch detection device 30, the touch detection electrodes TDL arranged in lines divide the touch detection region into a plurality of subregions. The touch detection electrodes TDL face the drive electrodes COML in the direction perpendicular to the surface of the TFT substrate 21. The touch detection electrodes TDL are coupled to inputs of the analog LPF 42 in the touch detection unit 40, respectively. Electrode patterns, in which the drive electrodes COML and the touch detection electrodes TDL intersect with each other, form capacitance in each intersection thereof.

With this configuration, when the touch detection device 30 performs touch detection operation, the drive electrode driver 14 drives the drive electrodes COML so as to perform line sequential scanning in a time division manner. As a consequence, the plurality of drive electrodes COML arranged in lines are selected one by one, and touch detection signals Vdet are outputted from the touch detection electrodes TDL. Thus, touch detection in the drive electrodes COML is performed in sequence. More specifically, the drive electrodes COML are equivalent to the aforementioned drive electrode E1 in the basic principle of capacitance-type touch detection, while the touch detection electrodes TDL are equivalent to the touch detection electrode E2. The touch detection device 30 detects a touch based on the basic principle. As illustrated in FIG. 11, the electrode patterns, in which the electrodes intersect with each other, form capacitance-type touch sensors in a matrix form. Therefore, by scanning the entire touch detection surface of the touch detection device 30, a position where an external proximity object is in contact or in proximity can also be detected.

1-1B. Operation and Function

A description will now be given of the operation and function of the display device with a touch detection function 1 of the first embodiment.

Since the drive electrodes COML function as common drive electrodes of the liquid crystal display unit 20 and also function as drive electrodes of the touch detection device 30, the driving signals Vcom may affect each other. Accordingly, the driving signal Vcom is applied to the drive electrodes COML separately in a display period B in which display operation is performed and in a touch detection period A in which touch detection operation is performed. The drive electrode driver 14 applies the driving signal Vcom as a display driving signal in the display period B in which display operation is performed. The drive electrode driver 14 also applies the driving signal Vcom as a touch driving signal in the touch detection period A in which touch detection operation is performed. In the following description, the driving signal Vcom as a display driving signal may be referred to as a display driving signal Vcomd, while the driving signal Vcom as a touch driving signal may be referred to as a touch driving signal Vcomt.

Overall Operation Outline

The control unit 11 supplies a control signal to each of the gate driver 12, the source driver 13, the drive electrode driver 14, and the touch detection unit 40 based on a video signal Vdisp supplied from the outside to control these constituent elements to be operated in synchronization with each other. In the display period B, the gate driver 12 supplies a scanning signal Vscan to the liquid crystal display unit 20, so that one horizontal line that is a target of display driving is sequentially selected. The source driver 13 supplies a pixel signal Vpix to each of the pixels Pix which constitute the one horizontal line selected by the gate driver 12 in the display period B.

In the display period B, the drive electrode driver 14 applies a display driving signal Vcomd to the drive electrode corresponding to one horizontal line, whereas in the touch detection period A, the drive electrode driver 14 sequentially applies a touch driving signal Vcomt, which is higher in frequency than the display driving signal Vcomd, to the drive electrode corresponding to touch detection operation so as to select the drive electrodes one by one. In the display period B, the display unit with a touch detection function 10 performs display operation based on the signals supplied by the gate driver 12, the source driver 13, and the drive electrode driver 14. In the touch detection period A, the display unit with a touch detection function 10 performs touch detection operation based on the signal supplied by the drive electrode driver 14, and outputs touch detection signals Vdet from the touch detection electrodes TDL. The analog LPF 42 amplifies and outputs the touch detection signals Vdet. The A/D convertor 43 converts the analog signals outputted from the analog LPF 42 into digital signals in a timing synchronous with the touch driving signal Vcomt. The signal processor 44 detects presence or absence of a touch with respect to the touch detection device 30 based on the output signals of the A/D convertor 43. When the touch is detected in the signal processor 44, the coordinate extractor 45 obtains touch panel coordinates thereof, and outputs an output signal Vout. The control unit 11 controls the detection timing controller 46 to change a sampling frequency of the touch driving signal Vcomt.

Detailed Operation

Figure 12:
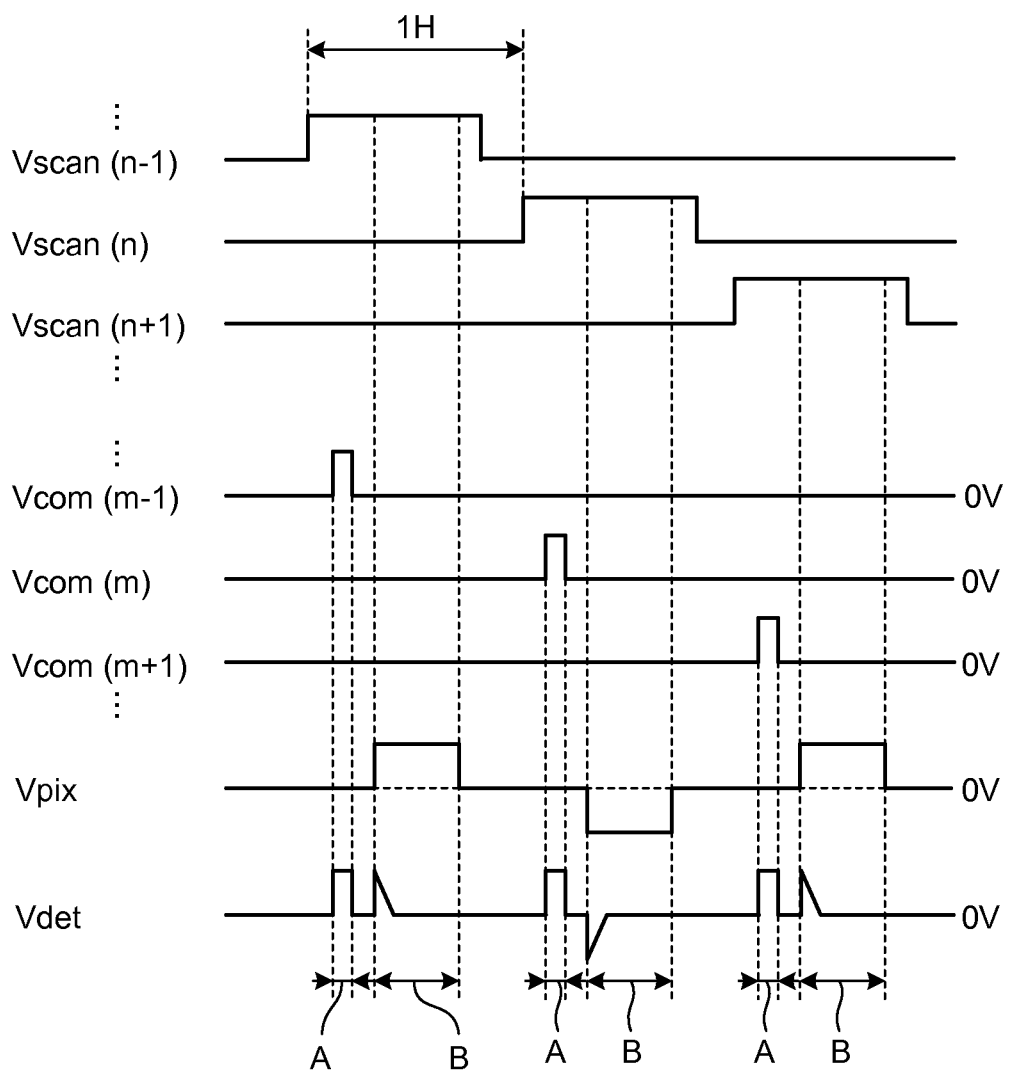
FIG. 12 is a timing waveform chart illustrating one operation example of the display device with a touch detection function according to the first embodiment.

A description will now be given of the detailed operation of the display device with a touch detection function 1. FIG. 12 is a timing waveform chart illustrating one operation example of the display device with a touch detection function 1 according to the first embodiment. As illustrated in FIG. 12, in response to a scanning signal Vscan supplied from the gate driver 12, the liquid crystal display unit 20 sequentially scans (n−1)-th, n-th, and (n+1)-th adjacent scanning signal lines GCL one by one, out of the scanning signal lines GCL, to perform display. Similarly, in response to the control signal supplied from the control unit 11, the drive electrode driver 14 sequentially supplies a specified voltage to drive electrodes COML corresponding to (m−1)-th, m-th, and (m+1)-th rows to be scanned, out of the plurality of drive electrodes COML in the display unit with a touch detection function 10.

Thus, in the display device with a touch detection function 1, the touch detection operation (touch detection period A) and the display operation (display period B) are performed in a time division manner in every display horizontal period 1H. In the touch detection operation, in every display horizontal period 1H, a different drive electrode COML is selected and a driving signal Vcom is applied thereto to perform touch detection scanning. This operation will be described in detail below.

First, the gate driver 12 applies a scanning signal Vscan to the (n−1)-th scanning signal line GCL, and the scanning signal Vscan (n−1) changes from a low level to a high level. This starts one display horizontal period 1H.

Next, in the touch detection period A, the drive electrode driver 14 applies a driving signal Vcom to a drive electrode COML corresponding to the (m−1)-th row, and the driving signal Vcom (m−1) changes from a low level to a high level. The driving signal Vcom (m−1) is transmitted to the touch detection electrode TDL via the capacitance, which changes a touch detection signal Vdet. Next, when the driving signal Vcom (m−1) changes from the high level to the low level, the touch detection signal Vdet is changed in a similar manner. The waveform of the touch detection signal Vdet in the touch detection period A corresponds to the touch detection signal Vdet in the basic principle of touch detection described before. The touch detection unit 40 performs touch detection by A/D-converting the touch detection signal Vdet in the touch detection period A. As a consequence, in the display device with a touch detection function 1, touch detection of one detection line (a region corresponding to one drive electrode COML) is performed.

Next, in the display period B, the source driver 13 applies a pixel signal Vpix to each of the pixel signal lines SGL to perform display of one horizontal line. As illustrated in FIG. 12, change in the pixel signal Vpix is transmitted to the touch detection electrodes TDL via the parasitic capacitance, so that the touch detection signal Vdet may change. However, in the display period B, an influence of the change in the pixel signal Vpix on the touch detection can be suppressed by disabling the A/D convertor 43 from performing A/D conversion. When the source driver 13 completes supply of the pixel signal Vpix, the gate driver 12 changes the scanning signal Vscan (n−1) applied to the (n−1)-th scanning signal line GCL from the high level to the low level, by which one display horizontal period 1H is ended.

Next, the gate driver 12 applies a scanning signal Vscan to an n-th scanning signal line GCL different from the previous line, so that the scanning signal Vscan (n) changes from the low level to the high level. This starts a next display horizontal period 1H.

In the next touch detection period A, the drive electrode driver 14 applies a driving signal Vcom to a drive electrode COML corresponding to the m-th row different from the previous row. A consequent change in the touch detection signal Vdet is A/D-converted by the touch detection unit 40, so that touch detection of the one detection line is performed. It should be noted that the drive electrode COML corresponding to the (m−1)-th row and the drive electrode COML corresponding to the m-th row may be the same drive electrode COML. Therefore, touch detection in the same region may be performed.

Next, in the display period B, the source driver 13 applies a pixel signal Vpix to each of the pixel signal lines SGL to perform display of one horizontal line. The display device with a touch detection function 1 of the present embodiment performs an inversion driving. Accordingly, the pixel signal Vpix applied by the source driver 13 has a polarity opposite to that in the previous display horizontal period 1H. After the display period B is ended, this one display horizontal period 1H is ended.

After this point, the display device with a touch detection function 1 repeats the above-described operation so as to perform display operation by scanning the entire display surface and also perform touch detection operation by scanning the entire touch detection surface. The display device with a touch detection function 1 also scans the entire touch detection surface, and detects a touch position based on the touch detection signals detected with the touch detection electrodes while the drive electrodes COML are respectively driven. In this case, the display device with a touch detection function 1 uses a touch detection signal at the time when the drive electrode COML, which detected a touch, is driven and touch detection signals at the time when drive electrodes COML, which are adjacent to the drive electrode COML that detected the touch, are driven to performs complement processing. More specifically, based on a distribution of the touch detection signals in an adjacent region, the position in the region corresponding to the drive electrode COML is calculated.

In the display device with a touch detection function 1, during one display horizontal period 1H, the touch detection operation is performed in the touch detection period A, while the display operation is performed in the display period B. Thus, since the touch detection operation and the display operation are performed in respective separate periods, both the display operation and the touch detection can be implemented during the same display horizontal period 1H, while an influence of the display operation on the touch detection can be suppressed. In the display device with a touch detection function 1, display processing of the entire display surface, i.e., display processing of an image of one frame, and touch detection processing of the entire touch detection surface may be performed alternately. The display device with a touch detection function 1 may also perform display processing of horizontal line corresponding to one drive electrode COML and then perform touch detection processing of a region corresponding to the one drive electrode COML.

1-1C. Drive Electrode Layer

Figure 13:
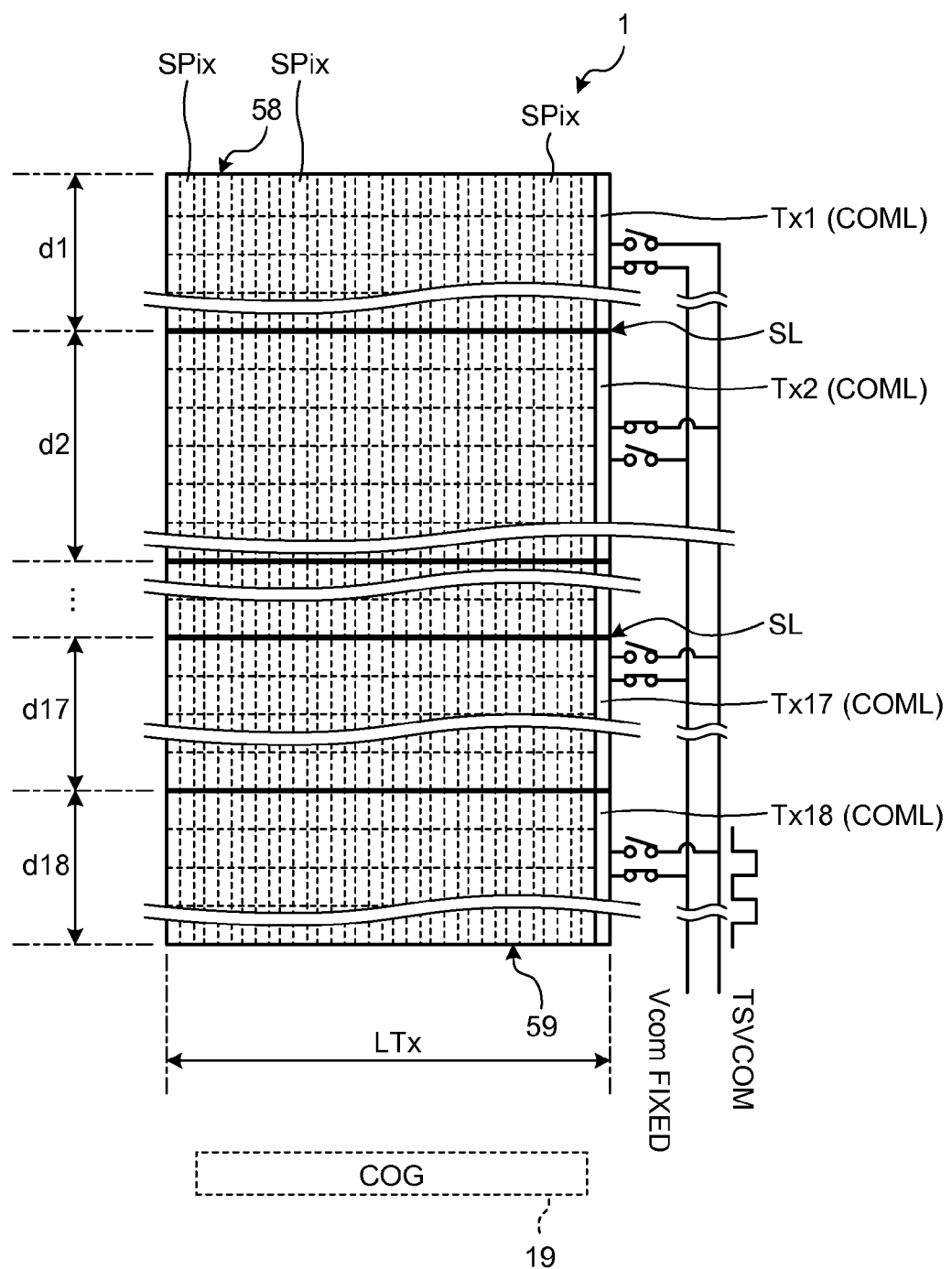
FIG. 13 is a plan view illustrating a relationship between a drive electrode layer and pixels in the display device with a touch detection function according to the first embodiment.

A description will now be given of the plurality of drive electrodes COML included in the drive electrode layer. FIG. 13 is a plan view illustrating a relationship between the drive electrode layer and pixels in the display device with a touch detection function according to the first embodiment. Hereinafter, for describing the plurality of drive electrodes COML arranged in an array direction, it is assumed that eighteen drive electrodes COML are arrayed. In the array direction of the drive electrodes COML, an end portion far from the COG 19 is defined as an upper end 58, while an end portion close to the COG 19 is defined as a lower end 59. The drive electrodes COML plurally arranged are numbered Tx1, Tx2, and . . . Tx17, Tx18 from the upper end 58 to the lower end 59. In the drive electrodes COML illustrated in FIG. 13, a voltage TSVCOM is applied to a drive electrode COML which detects a touch in touch detection, while a constant voltage VCOM is applied to the other drive electrodes COML.

In the display device with a touch detection function 1 of the present embodiment, the plurality of drive electrodes COML included in the drive electrode layer are arranged in lines in the array direction (short side direction of one drive electrode COML) as described above. As illustrated in FIG. 13, the drive electrode layer is configured so that the drive electrodes COML (end drive electrodes) arranged at the end portions, i.e., the drive electrode Tx1 arranged at the upper end 58 and the drive electrode Tx18 arranged at the lower end 59, are shorter in array direction width (length) than the other drive electrodes, i.e., the drive electrodes Tx2 to Tx17 arranged on an inner side (central side) of the drive electrode Tx1 and Tx18 in the array direction. More specifically, when the length of the drive electrode Tx1 in the array direction is defined as d1, the length of the drive electrode Tx2 in the array direction is defined as d2, the lengths of the drive electrodes Tx3 to Tx17 in the array direction are similarly defined as d3 to d17, and the length of the drive electrode Tx18 in the array direction is defined as d18, the lengths d1 and d18 are shorter than the lengths d2 to d17 in the display device with a touch detection function 1. The lengths d1 and d18 are the same as each other, and the lengths d2 to d17 are also the same as each other. In other words, the relationship of the lengths d1 to length d18 in the display device with a touch detection function 1 is expressed as d1=d18<d2=d3=d4= . . . d17.

The drive electrodes Tx1 to Tx18 are the same as each other in the length of the direction orthogonal to the array direction (=the length in the longitudinal direction of each drive electrode). When the length in the direction orthogonal to the array direction of the respective drive electrodes Tx1 to Tx18 is defined as LTx, the area of each drive electrode Txn (n=1 to 18) is expressed as dn×LTx. Therefore, size relation of the areas is proportional to the length of each of the drive electrodes Tx1 to Tx18 in the array direction. Accordingly, in the display device with a touch detection function 1, the area of the drive electrode Tx1 is the same as the area of the drive electrode Tx18, and the areas of the drive electrode Tx1 and the drive electrode Tx18 are smaller than the areas of the other drive electrodes Tx2 to Tx17.

The drive electrodes Tx1 to Tx18 are arranged corresponding to horizontal lines of the pixels Pix. That is, boundary positions of the drive electrodes Tx1 to Tx18 match with boundaries of the horizontal lines of the sub-pixels SPix (or pixels Pix). More specifically, the array direction widths of the drive electrodes Tx1 to Tx18 are integer multiples of the width of the horizontal line, and one horizontal line corresponds to one drive electrode COML (any one of the drive electrodes Tx1 to Tx18). In one example, when the display device with a touch detection function 1 has 1280 horizontal lines, each of the lengths d1 and d18 corresponds to 64 horizontal lines, and each of the lengths d2 to d17 corresponds to 72 horizontal lines. The relationship between the lengths d1 and d18 and the lengths d2 to 17 is not limited to this example. Joint portions between the drive electrodes Tx1 to Tx18 and the wirings that supply VCOM and TSVCOM extend outward from an end portion of the display surface (valid pixel region).

The drive electrode Tx1 to Tx18 are respectively coupled to the COG 19 provided on the lower end 59 side via wirings, so that a driving signal is applied from the drive electrode driver 14 incorporated in the COG 19. The drive electrodes Tx1 to Tx18 are arranged in lines from the upper end 58 to the lower end 59. Accordingly, the wirings that respectively couple the drive electrodes Tx1 to Tx18 to the COG 19 have different lengths in accordance with arrangement positions of the respective drive electrodes. More specifically, the drive electrode Tx1 is coupled to the COG 19 with a longest wiring, the drive electrode Tx2 is coupled to the COG 19 with a second longest wiring, and the drive electrode Tx3 is coupled to the COG 19 with a third longest wiring. Similarly, as the arrangement position is nearer to the COG 19, the wiring of the drive electrode becomes shorter, and so the drive electrode Tx18 is coupled to the COG 19 with a shortest wiring.

A time constant t of a driving signal supplied to each of the drive electrodes Tx1 to Tx18 is a value that changes based on a resistance value (wiring resistance value) $R_a$ that is proportional to a length of the wiring and a capacitance C of each of the drive electrodes Tx1 to Tx18. The time constant t is expressed as $\tau=R_a C$. The resistance value $R_a$ is larger as the wiring becomes longer. Therefore, among the drive electrodes Tx1 to Tx18, the drive electrode Tx1 has a largest wiring resistance value $R_a$. Next, the capacitance C of each of the drive electrodes Tx1 to Tx18 changes in accordance with the area of each drive electrode that overlaps with at least one of the scanning signal lines and the pixel signal lines. More specifically, the capacitance C increases as the area of the drive electrode that overlaps with at least one of the scanning signal lines and the pixel signal lines becomes larger. In the display device with a touch detection function 1 of the first embodiment, the drive electrode Tx1, which is coupled to the COG 19 with a longest wiring and therefore has a high wiring resistance value, is configured to have an area smaller than other drive electrodes Tx2 to Tx17. Since the drive electrode Tx1 is smaller in area than other drive electrodes Tx2 to Tx17, the area of the drive electrode Tx1 that overlaps with at least one of the scanning signal lines and the pixel signal lines also becomes smaller. As a consequence, the capacitance of the drive electrode Tx1 can be made smaller than the capacitance of each of other drive electrodes Tx2 to Tx17.

Thus, in the display device with a touch detection function 1 of the first embodiment, the drive electrode Tx1 having a largest wiring resistance value $R_a$ is made smaller in area than each of other drive electrodes Tx2 to Tx17, and thereby the capacitance C of the drive electrode Tx1 is decreased. As a result, the time constant t of the drive electrode Tx1 with respect to the driving signal is made smaller. In other words, the time constant t of the drive electrode Tx1 can be approximated to those of the drive electrodes Tx2 to Tx17 which have smaller wiring resistance values $R_a$. This makes it possible to shorten the time taken for the driving signal applied to the drive electrode Tx1 to attain a specified level (a specified voltage, i.e., a touch detectable voltage).

Figure 14:
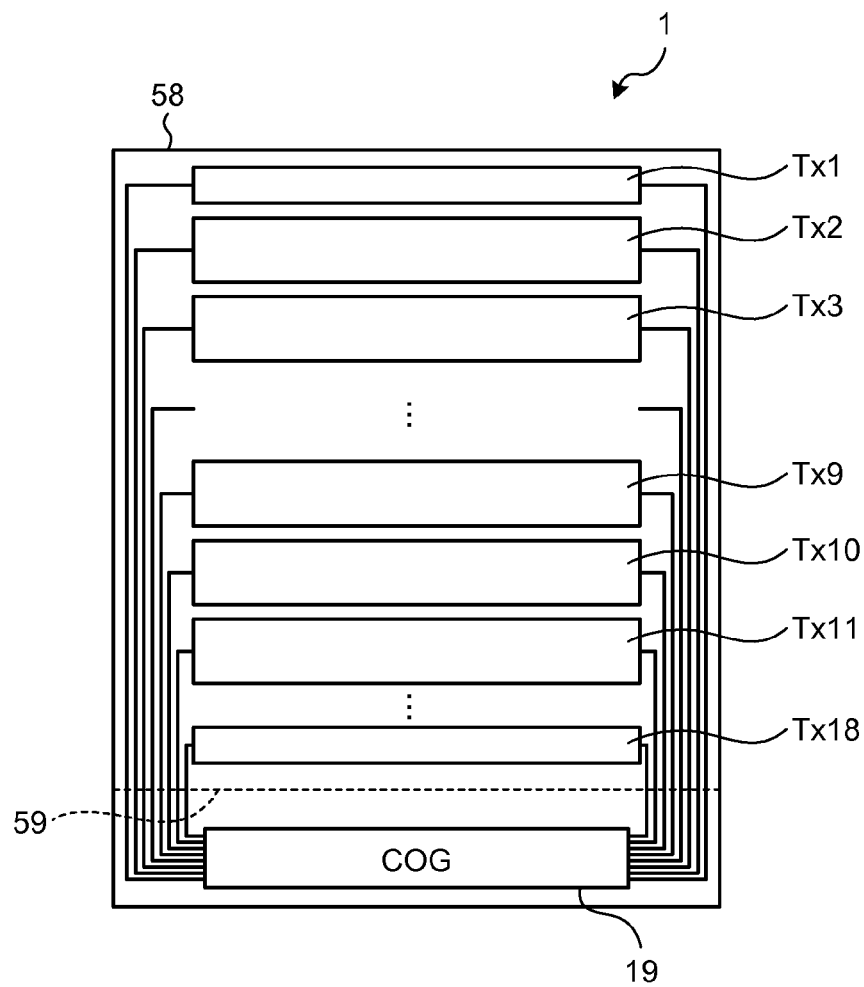
FIG. 14 is a front view illustrating the display device with a touch detection function according to the first embodiment.
Figure 15:
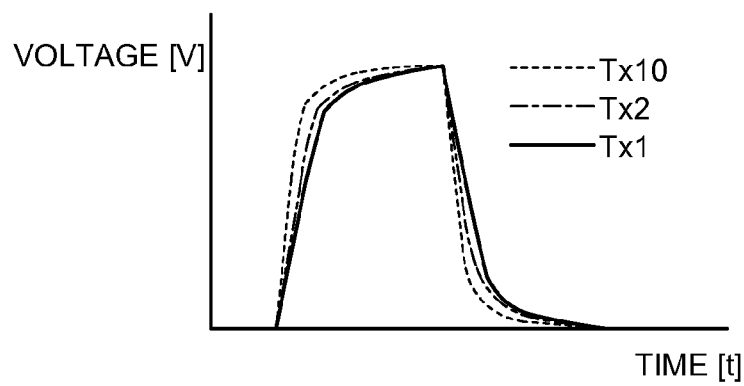
FIG. 15 is an explanatory view illustrating change in voltage in each drive electrode in the display device with a touch detection function illustrated in FIG. 14.
Figure 16:
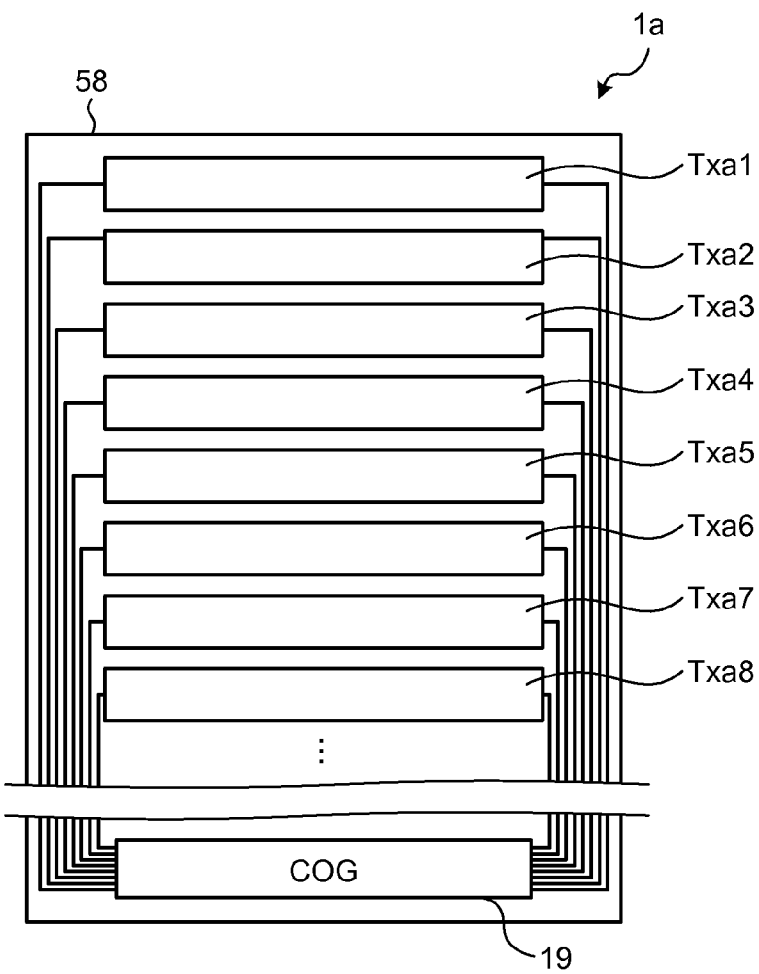
FIG. 16 is a front view illustrating a display device with a touch detection function of a comparative example.
Figure 17:
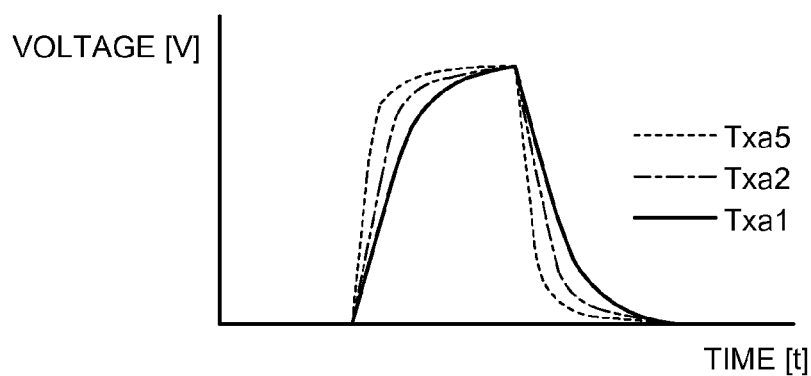
FIG. 17 is an explanatory view illustrating change in voltage in each drive electrode in the display device with a touch detection function illustrated in FIG. 16.

A concrete description will now be given with reference to FIG. 14 to FIG. 17. FIG. 14 is a front view illustrating the display device with a touch detection function according to the first embodiment. FIG. 15 is an explanatory view illustrating change in voltage in each drive electrode in the display device with a touch detection function illustrated in FIG. 14. FIG. 16 is a front view illustrating a display device with a touch detection function of a comparative example. FIG. 17 is an explanatory view illustrating change in voltage in each drive electrode in the display device with a touch detection function illustrated in FIG. 16.

As illustrated in FIG. 14, in the display device with a touch detection function 1 of the first embodiment, the drive electrodes Tx1 and Tx18 are narrower in the array direction width and smaller in area than the other drive electrodes Tx2 to Tx17. In this configuration, a driving voltage was applied to the drive electrode (endmost drive electrode, specific drive electrode) Tx1 coupled to the COG 19 with a longest wiring, the drive electrode (near end drive electrode) Tx2 coupled to the COG 19 with a second longest wiring, and the drive electrode (central drive electrode) Tx10 coupled to the COG 19 with a middle-length wiring among the drive electrodes Tx1 to Tx18 in the display device with a touch detection function 1 illustrated in FIG. 14 to measure voltage change in each of the drive electrodes. The measurement result indicated the relationship as illustrated in FIG. 15.

As illustrated in FIG. 15, a voltage rise in the case of a voltage waveform of the drive electrode Tx10 was fastest, and the voltage rise was slower in the order of the voltage waveforms of the drive electrodes Tx2 and Tx1. However, a difference in time taken for attaining a specified voltage was small.

A display device with a touch detection function 1a of a comparative example illustrated in FIG. 16 is configured so that each of the drive electrodes Txa1 to Txa18 has the same shape and the same size (=the same area). More specifically, the array direction lengths of the drive electrodes Txa1 to Txa18 are the same as each other. Since the display device with a touch detection function 1a of the comparative example is similar in configuration to the display device with a touch detection function 1 except this point, a description of the display device 1a is not repeated. A driving voltage was also applied to the drive electrode Txa1 coupled to the COG 19 with a longest wiring, the drive electrode Txa2 coupled to the COG 19 with a second longest wiring, and the drive electrode Txa5 coupled to the COG 19 with a middle-length wiring among the drive electrodes Txa1 to Txa18 in the display device with a touch detection function 1a illustrated in FIG. 16 to measure voltage change in each of the drive electrodes. The measurement result indicated the relationship as illustrated in FIG. 17.

As illustrated in FIG. 17, a voltage rise in the case of a voltage waveform of the drive electrode Txa5 was fastest, and the voltage rise was slower in the order of the voltage waveforms of the drive electrodes Txa2 and Txa1. In the waveforms illustrated in FIG. 17, the difference between the time taken for the voltage waveform of the drive electrode Txa1 to attain a specified voltage and the time taken for the voltage waveforms of the drive electrodes Txa5 and the drive electrode Txa2 to attain the specified voltage is large.

Therefore, as is clear from the comparison between FIGS. 15 and 17, the display device with a touch detection function 1 of the first embodiment can approximate the time constant τ of the drive electrode Tx1 to the time constant of the other drive electrodes. Accordingly, it becomes possible to prevent the drive electrode Tx1 from taking a considerably longer time to attain a specified voltage level from reception of a driving signal than the other driving electrodes.

In designing the system of the display device with a touch detection function 1, the drive electrode that apply a driving signal are configured to be switched at a constant interval with use of a clock, so that a control circuit can be simplified and processing of detected signals can be facilitated. In this case, based on the time taken for a driving signal, which is supplied to the drive electrode having a largest time constant, to attain a specified level, such timing as data processing timing and driving signal supply timing (time to apply a driving signal to one drive electrode) are set. In the display device with a touch detection function 1, the drive electrode Tx1 has a largest time constant due to the wiring resistance value. The time constant of the drive electrode Tx1 can be decreased by making the area of the drive electrode Tx1 smaller. As a consequence, the time taken for applying a driving signal to one drive electrode can be set shorter since the time constant of the drive electrode having a largest time constant can be decreased. This makes it possible to shorten the time taken for touch detection while maintaining the touch detection accuracy.

As in the present embodiment, in the display device with a touch detection function 1, the array direction lengths of the drive electrodes COML are preferably integer multiples of the array direction length of one horizontal line, i.e., the pixel Pix. Further, in the display device with a touch detection function 1, the drive electrodes are preferably arranged so that one drive electrode faces one horizontal line. That is, in the display device with a touch detection function 1, the drive electrodes are preferably arranged so that a boundary position SL between a drive electrode and another drive electrode in the array direction may overlap with a boundary between a horizontal line and another horizontal line. As a result, it becomes possible to facilitate control in the case of using the drive electrodes COML as the drive electrodes for displaying an image on the display surface.

In the display device with a touch detection function 1, it is also preferable that differences in the array direction length between the drive electrodes at the end portion and the other drive electrodes are even-number multiples of the array direction length of one horizontal line, i.e., the pixel Pix. As a consequence, in the case where the device is configured to have a circuit on both the ends in the right and left direction (the direction orthogonal to the array direction) of the drive electrodes, a circuit having the same configuration can be arranged on both the right and left sides. This facilitates design, manufacturing and control of the device.

In the display device with a touch detection function 1, it is preferable that the drive electrode layer is symmetric with respect to the center of the array direction. This facilitates design, manufacturing and control of the device. When the drive electrodes on both the ends of the array direction are configured to have a width narrower than that of the other drive electrodes as described in the foregoing, the aforementioned effects can be achieved more appropriately. In the present embodiment, although the drive electrode layer is symmetric with respect to the center of the array direction, the present disclosure is not limited thereto. As long as the drive electrode Tx1 has an area smaller than the other drive electrodes, all the rest of the drive electrodes may have the same size.

In the display device with a touch detection function 1 of the present embodiment, the drive electrodes COML are each formed as a plate-like transparent electrode. However, the present disclosure is not limited thereto. In the display device with a touch detection function 1, one drive electrode COML may be divided into a plurality of electrodes. For example, in the display device with a touch detection function 1, one drive electrode COML may be divided into a plurality of unit drive electrodes for respective horizontal lines. Also in this case, the display device with a touch detection function 1 simultaneously drives the plurality of unit drive electrodes included in one drive electrode COML at the time of touch detection.

1-2 Second Embodiment

Figure 18:
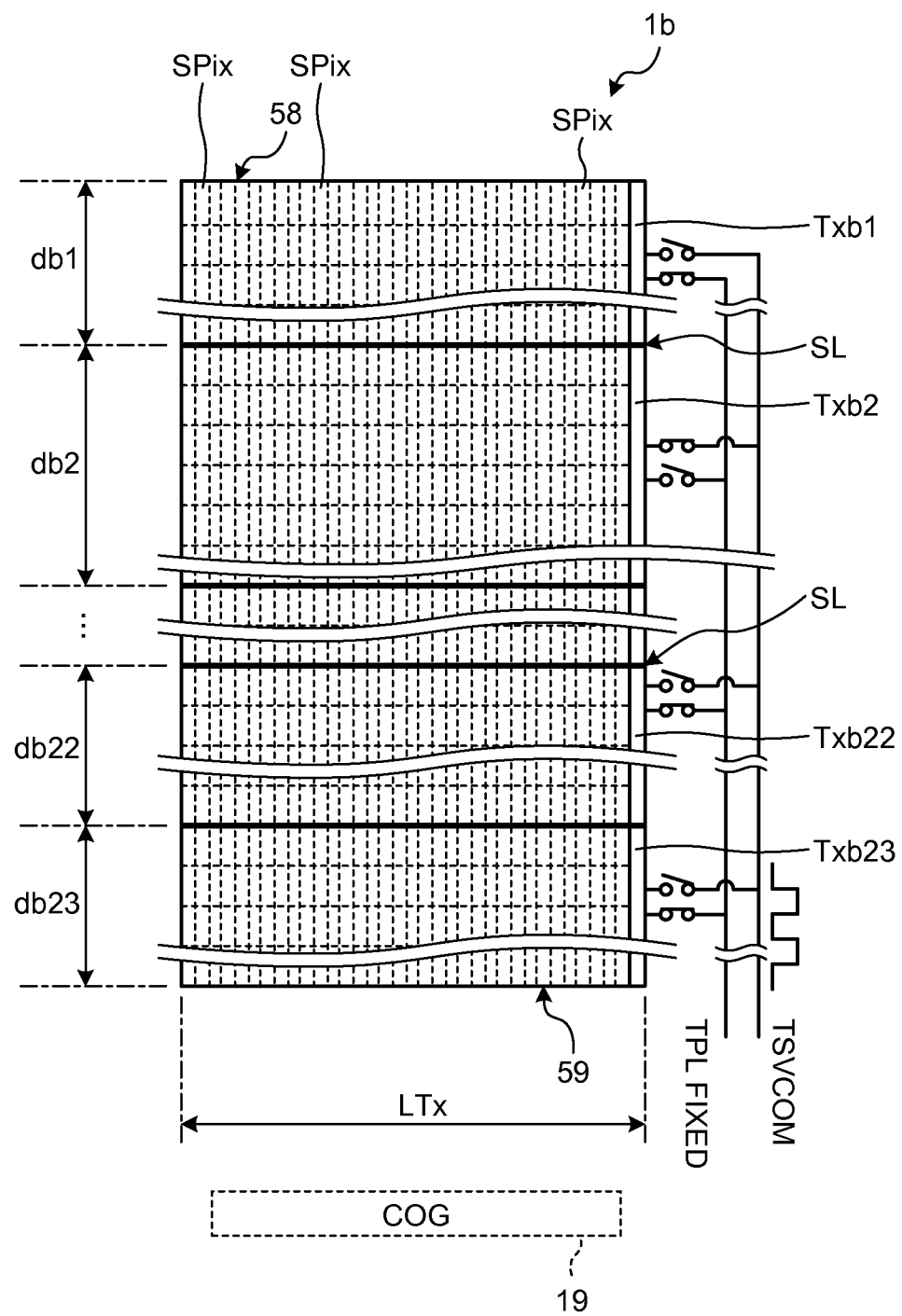
FIG. 18 is a plan view illustrating a relationship between a drive electrode layer and pixels in a display device with a touch detection function according to a second embodiment.
Figure 19:
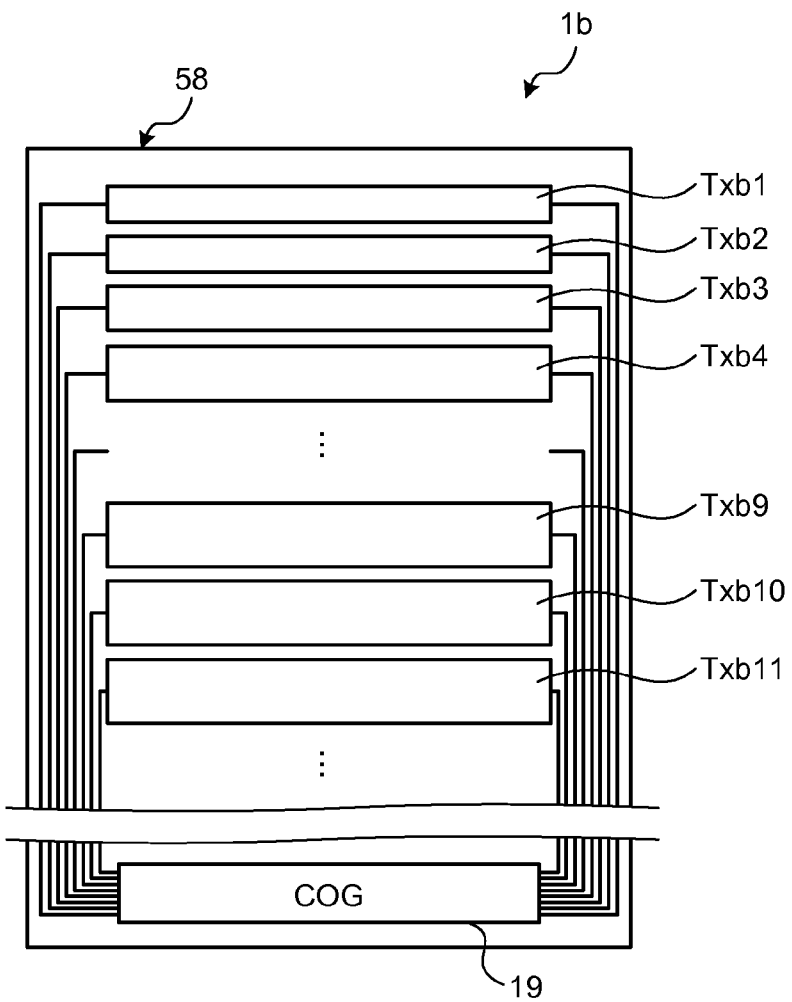
FIG. 19 is a front view illustrating the display device with a touch detection function according to the second embodiment.
Figure 20:
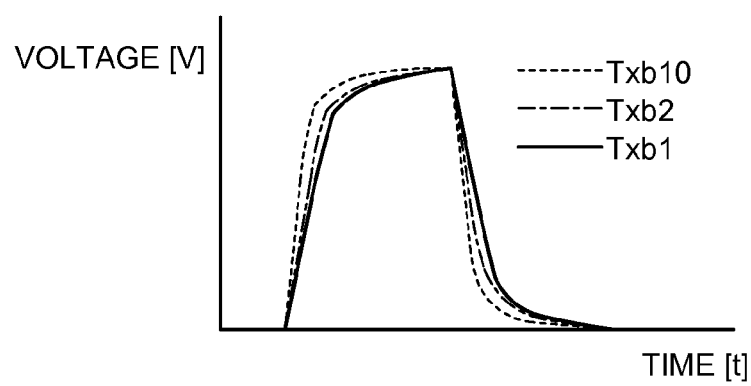
FIG. 20 is an explanatory view illustrating change in voltage in each drive electrode in the display device with a touch detection function illustrated in FIG. 19.

Now, a display device with a touch detection function 1*b* of a second embodiment will be described with reference to FIG. 18 to FIG. 20. FIG. 18 is a plan view illustrating a relationship between a drive electrode layer and pixels in the display device with a touch detection function according to the second embodiment. FIG. 19 is a front view illustrating the display device with a touch detection function according to the second embodiment. FIG. 20 is an explanatory view illustrating change in voltage in each drive electrode in the display device with a touch detection function illustrated in FIG. 19.

Hereinafter, the display device with a touch detection function 1*b* according to the second embodiment will be described as the device including 23 drive electrodes COML arrayed in the array direction. In the array direction of the drive electrodes COML, an end portion far from the COG 19 is defined as an upper end 58, while an end portion close to the COG 19 is defined as a lower end 59. The drive electrodes COML plurally arranged are numbered Txb1, Txb2, . . . Txb22, Txb23 from the upper end 58 to the lower end 59. In the display device with a touch detection function 1*b* illustrated in FIGS. 18 and 19, a voltage TSVCOM is applied to a drive electrode COML which detects a touch in touch detection, while a constant voltage VCOM is applied to the other drive electrodes COML. The display device with a touch detection function 1*b* of the second embodiment is similar in configuration to the display device with a touch detection function 1 of the above-mentioned first embodiment except that the areas of the respective drive electrodes becomes larger in stages as described below. Hereinafter, a description will be given while focused on characteristic aspects of the display device with a touch detection function 1*b* of the second embodiment.

In the display device with a touch detection function 1*b* of the second embodiment, the plurality of drive electrodes COML are arranged in lines in the array direction (short side direction of one drive electrode COML) as described above. The respective drive electrodes Txb1 to Txb23 illustrated in FIG. 18 are configured as shown below. That is, the drive electrode Txb1 coupled to the COG 19 with a longest wiring is made to have a smallest size (area), and a specified number of the drive electrodes subsequent to the drive electrode Txb1, which is made to have the smallest area, are made to have areas larger in stages in order of arrangement.

More specifically, when the display device with a touch detection function 1*b* has 1280 horizontal lines for example, the drive electrode Txb1 has a width db1 corresponding to 42 horizontal lines, the drive electrode Txb2 has a width db2 corresponding to 44 horizontal lines, and the drive electrode Txb3 has a width db3 corresponding to 44 horizontal lines. The drive electrode Txb4 has a width db4 corresponding to 48 horizontal lines, the drive electrode Txb5 has a width db5 corresponding to 50 horizontal lines, and the drive electrode Txb6 has a width db6 corresponding to 52 horizontal lines. The drive electrode Txb7 has a width db7 corresponding to 54 horizontal lines, and the drive electrode Txb8 has a width db8 corresponding to 56 horizontal lines. The drive electrodes Txb9 to Txb14 have widths db9 to db14 each corresponding to 58 horizontal lines, and the drive electrodes Txb15 to Txb23 have widths d15 to db23 each corresponding to 60 horizontal lines. The relationship between the widths db1 to db23 of the respective drive electrodes Txb1 to Txb23 is not limited to the relationship disclosed.

In other words, when a length of each of the drive electrodes Txb1 to Txb23 in the direction orthogonal to the array direction (=the length in the short side direction of each drive electrode) is defined as LTx, the relationship of the drive electrodes is expressed as shown below: db1×LTx<db2×LTx<db3×LTx<db4×LTx<db6×LTx<db7×LTx<db8×LTx<db9×LTx=db10×LTx=db11×LTx=db12×LTx=db13×LTx=db14×LTx<db15×LTx=db16×LTx=db17×LTx=db18×LTx=db19×LTx=db20×LTx=db21×LTx=db22×LTx=db23×LTx. More specifically, in the display device with a touch detection function 1*b*, the drive electrode Txb1 has a smallest area, the drive electrodes Txb1 to Txb9 have areas that increase stepwisely, the drive electrodes Txb9 to Txb14 have the same area as each other, and the drive electrodes Tx15 to Txb23 have an area that is the same with each other and is larger than that of the drive electrodes Tx9 to Txb14. As for the length of the wiring which couples each of the drive electrodes Txb1 to Txb23 with the COG 19, the electrode Txb1 is coupled with the COG 19 via a longest wiring, the drive electrode Txb2 is coupled with the COG 19 via a second longest wiring, the drive electrode Txb3 is coupled with the COG 19 via a third longest wiring, and the drive electrode Txb23 is coupled with the COG 19 via a shortest wiring.

In the display device with a touch detection function 1*b* of the second embodiment, the drive electrodes Txb1 to Txb23 are made to have areas larger in stages so that the areas correspond to the lengths of the wirings between the respective drive electrodes Txb1 to Txb23 and the COG 19. More specifically, the drive electrode Txb1 coupled with the COG 19 via a longest wiring is made to have a minimum area, the drive electrode Txb2 coupled with the COG 19 via a second longest wiring is made to have an area larger than the drive electrode Txb1, and the drive electrode Txb3 coupled with the COG 19 via a third longest wiring is made to have an area larger than the drive electrode Txb2. The areas of the electrodes increase in stages from the drive electrode Txb1 to the drive electrode Txb23.

Thus, in the display device with a touch detection function 1b of the second embodiment, the areas of the respective drive electrodes Txb1 to Txb23 are adjusted in accordance with the lengths of the wirings between the respective drive electrodes Txb1 to Txb23 and the COG 19. As a result, it becomes possible to decrease a difference in time constant of the driving signal supplied to each of the drive electrodes Txb1 to Txb23 whose areas are changed in accordance with the lengths of the wirings. A driving voltage was applied to the drive electrode (endmost drive electrode, specific drive electrode) Txb1 coupled to the COG 19 with a longest wiring, the drive electrode (near end drive electrode) Txb2 coupled to the COG 19 with a second longest wiring, and the drive electrode (central drive electrode) Tx10 coupled to the COG 19 with a middle-length wiring among the drive electrodes Txb1 to Txb23 in the display device with a touch detection function 1b illustrated in FIG. 19 to measure voltage change in each of the drive electrodes. The measurement result indicated the relationship as illustrated in FIG. 20.

As illustrated in FIG. 20, a voltage rise in the case of a voltage waveform of the drive electrode Txb10 was fastest, and the voltage rise was slower in the order of the voltage waveforms of the drive electrodes Txb2 and Txb1. However, a difference in time taken for attaining a specified voltage was small. The device 1b can decrease the difference in the time taken for attaining a specified voltage more than the display device with a touch detection function 1 of the first embodiment.

In the display device with a touch detection function 1b, the respective drive electrodes Txb1 to Txb23 are made to have areas that increase in stages from the upper end 58 side to the lower end 59 side. However, the drive electrodes may be made to have areas that gradually (linearly) increase from the upper end 58 side to the lower end 59 side. The drive electrodes may also have a symmetric configuration in which the drive electrode at the center in the array direction has a largest area and the other drive electrodes have smaller areas as they are away from the center.

1-3 Third Embodiment

Figure 21:
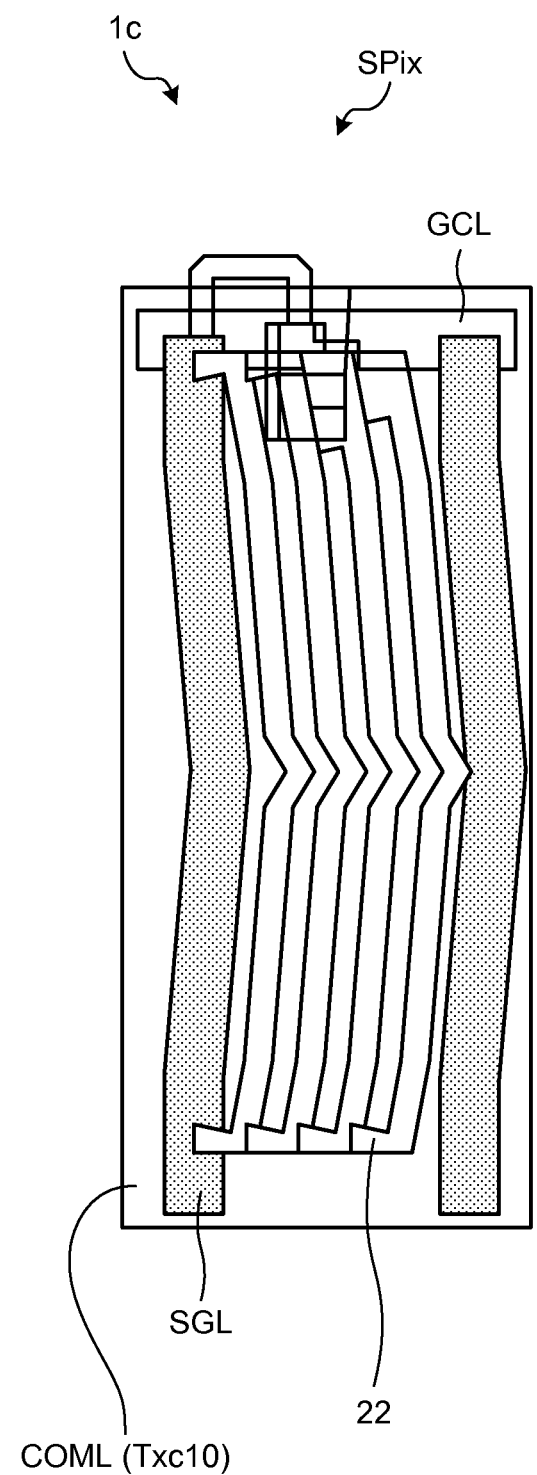
FIG. 21 is a front view illustrating a relationship between a drive electrode and signal lines in a central portion in a display device with a touch detection function according to a third embodiment.
Figure 22:
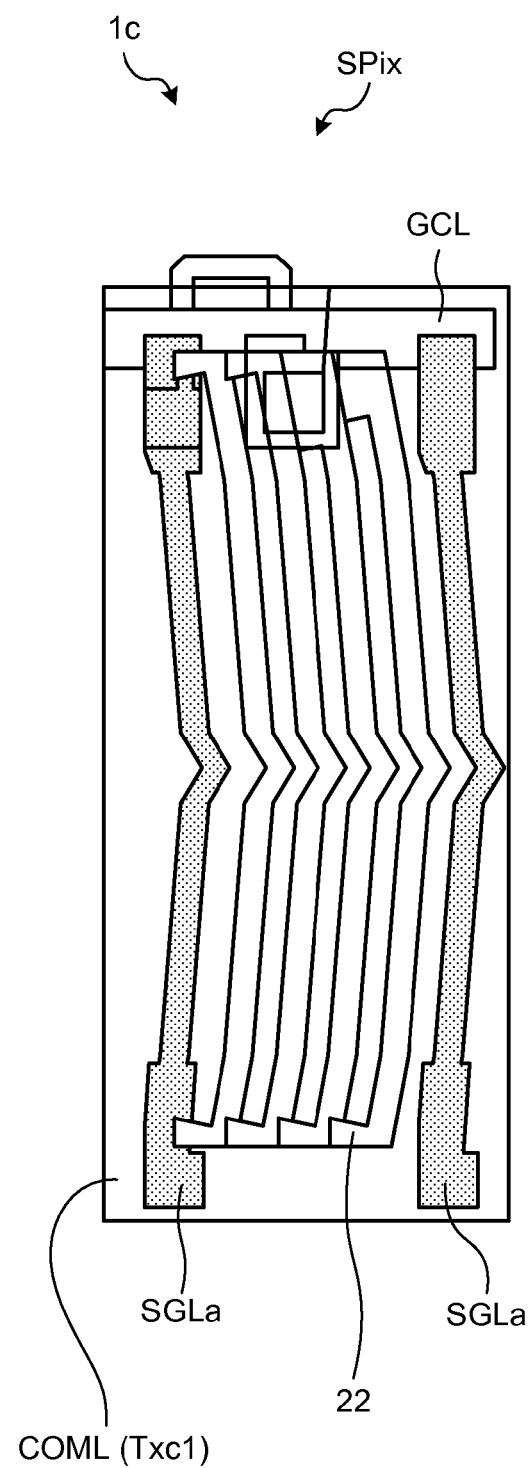
FIG. 22 is a front view illustrating a relationship between a drive electrode and signal lines in an end portion in the display device with a touch detection function according to the third embodiment.

A description will now be given of a display device with a touch detection function in a third embodiment of the present disclosure with reference to FIGS. 21 and 22. FIG. 21 is a front view illustrating a relationship between a drive electrode and signal lines in a central portion in the display device with a touch detection function according to the third embodiment. FIG. 22 is a front view illustrating a relationship between a drive electrode and signal lines in an end portion in the display device with a touch detection function according to the third embodiment. A display device with a touch detection function 1c is similar to the display device with a touch detection function 1 except the shape of the pixel signal lines SGL. Hereinafter, a description will be given while focused on characteristic aspects of the display device with a touch detection function of the third embodiment.

As illustrated in FIGS. 21 and 22, in each sub-pixel SPix of the display device with a touch detection function 1c, a pixel electrode 22 having a plurality of wirings corresponding to each sub-pixel SPix, a scanning signal line GCL for scanning and driving a horizontal line, a drive electrode COML, and a pixel signal line SGL are arranged. FIG. 21 illustrates a sub-pixel of a drive electrode Txc10 which is among the other drive electrodes, and FIG. 22 illustrates a sub-pixel of a drive electrode Txc1 which is a specific drive electrode (drive electrode coupled with a longest wiring).

In the display device with a touch detection function 1c, the pixel signal line SGLa in each sub-pixel of the drive electrode Txc1 is thinner than the pixel signal line SGL in each sub-pixel of the drive electrode Txc10. That is, the pixel signal line SGL in each sub-pixel of the drive electrode Txc1 is smaller in area than the pixel signal line SGL in each sub-pixel of the drive electrode Txc10.

In the display device with a touch detection function 1c of the third embodiment, the pixel signal line SGLa in each sub-pixel of the drive electrode Txc1 is made smaller in area than the pixel signal line SGL in each sub-pixel of the drive electrode Txc10 so as to decrease the area where the drive electrode COML and the pixel signal line SGL overlap with each other. Thus, decreasing the area of the pixel signal line SGLa makes it possible to reduce the capacitance of the drive electrode COML and to thereby make the time constant smaller.

In the display device with a touch detection function 1c of the third embodiment, the same effects as those in the previous embodiments can be achieved by making the pixel signal line SGLa in each sub-pixel of the drive electrode Txc1 to be smaller in area than the pixel signal line SGL in each sub-pixel of the other drive electrodes. In this case, even when the drive electrode Txc1 and the other drive electrodes have the same area, a difference in time constant can still be decreased. Although the pixel signal lines SGL are made to have small areas in the present embodiment, the scanning signal lines GCL may have small areas instead.

1-4 Fourth Embodiment

Figure 23:
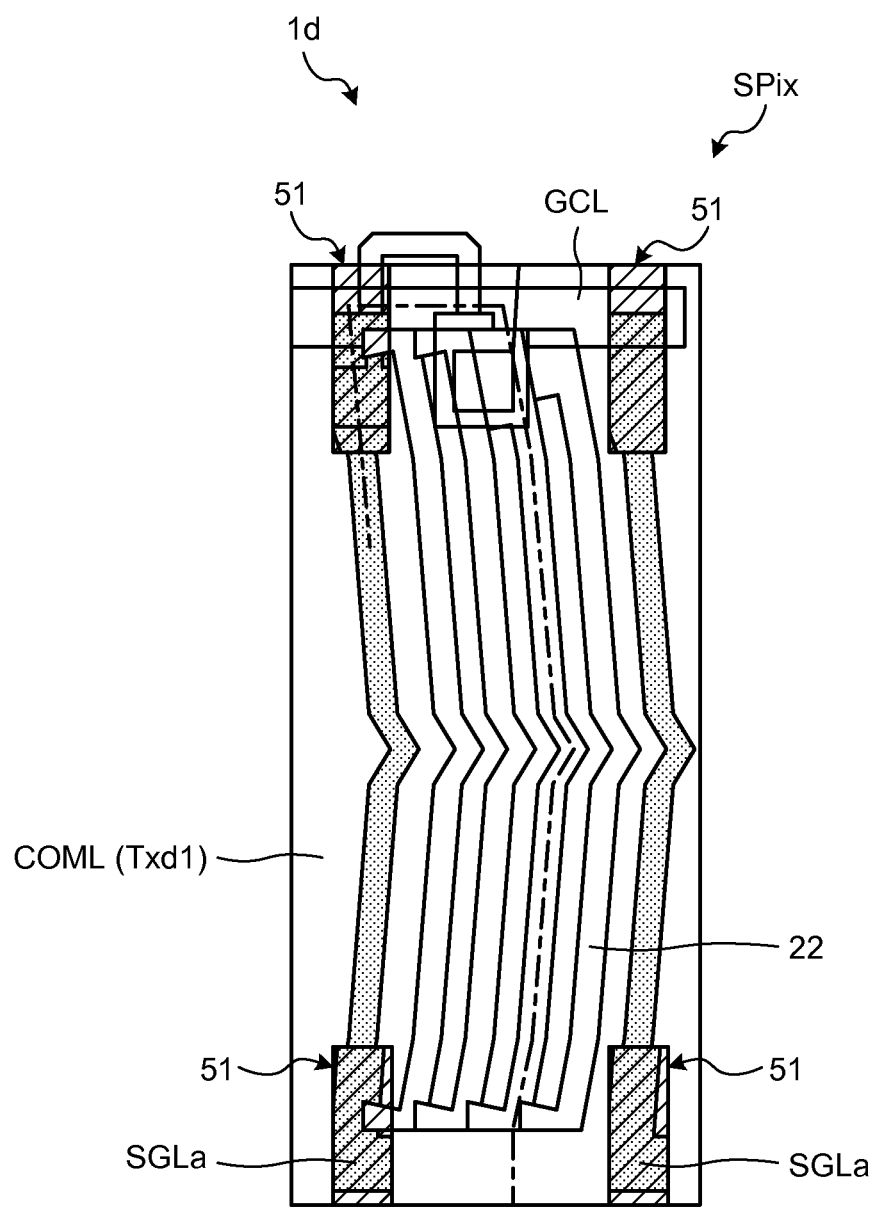
FIG. 23 is a front view illustrating a relationship between a drive electrode and signal lines in an end portion in a display device with a touch detection function according to a fourth embodiment.

A description will now be given of a display device with a touch detection function 1d in a fourth embodiment of the present disclosure with reference to FIG. 23. FIG. 23 is a front view illustrating a relationship between a drive electrode and signal lines in an end portion in the display device with a touch detection function according to the fourth embodiment. The display device with a touch detection function 1d is similar to the display device with a touch detection function 1c except the shape of the drive electrodes. Hereinafter, a description will be given while focused on characteristic aspects of the display device with a touch detection function 1d of the fourth embodiment.

In the display device with a touch detection function 1d of the fourth embodiment illustrated in FIG. 23, an opening (nonforming portion) 51 is formed at a position which overlaps with the pixel signal line SGL of a drive electrode Txd1. In other words, a portion where the drive electrode is not formed is provided in specified parts of the drive electrode COML in the display device with a touch detection function 1d of the fourth embodiment. That is, in the display device with a touch detection function 1d, the drive electrode COML has a region without indium tin oxide (ITO) formed at positions which overlap with the pixel signal lines SGL.

In the display device with a touch detection function 1d of the fourth embodiment, the pixel signal line SGL in each of the sub-pixels SPix corresponding to the drive electrode Txd1 is thinned, and further the opening 51 is provided in the portions of the drive electrode Txd1 which overlap with the pixel signal lines SGL. As a result, the area of the drive electrode which overlaps with at least one of the scanning signal lines and the pixel signal lines can be made further smaller and thereby the capacitance can be reduced more. Thus, forming the opening 15 can also make the time constant smaller, and the same effects as those in other embodiments can be achieved.

1-5 Fifth Embodiment

A description will now be given of a display device with a touch detection function 1e of a fifth embodiment of the present disclosure. In the case of the display devices with a touch detection function 1 and 1b in the aforementioned first and second embodiments, the drive electrodes COML are provided on the pixel substrate 2 side, and the touch detection electrodes TDL are provided on the counter substrate 3 side. In the display device with a touch detection function 1e in the fifth embodiment, the touch detection electrodes TDL are provided on the pixel substrate 2 side, and the drive electrodes are provided on the counter substrate 3 side. Expect this point, the display device with a touch detection function of the fifth embodiment is similar in configuration to the display devices with a touch detection function 1 and 1b of the aforementioned first and second embodiments. Hereinafter, a description will be given while focused on characteristic aspects of the display device with a touch detection function 1e of the fifth embodiment.

Figure 24:
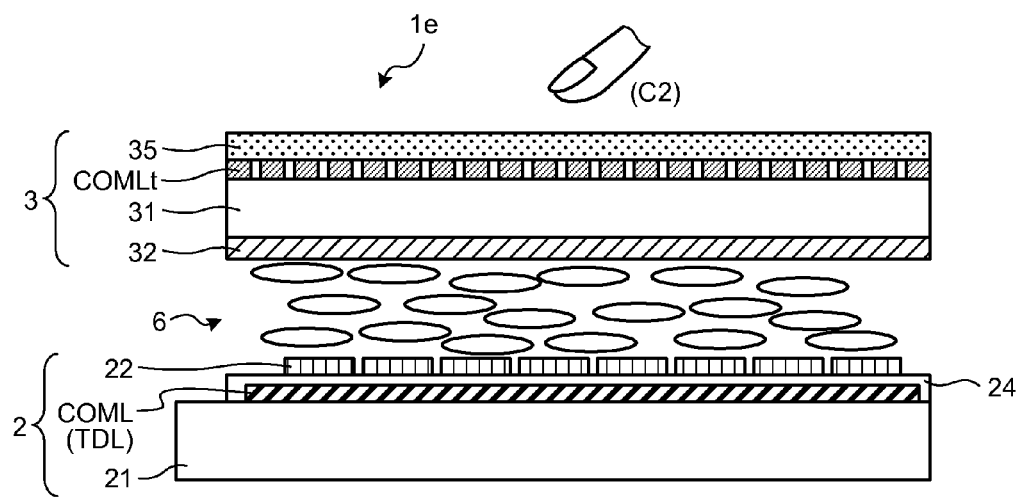
FIG. 24 is a cross sectional view illustrating a schematic cross sectional configuration of a display device with a touch detection function according to a fifth embodiment.

FIG. 24 is a cross sectional view illustrating a schematic cross sectional configuration of a principle part of the display device with a touch detection function according to the fifth embodiment. The display device with a touch detection function 1e illustrated in FIG. 24 includes a pixel substrate 2, a counter substrate 3 arranged so as to face the surface of the pixel substrate 2 in a direction perpendicular to the surface, and a liquid crystal layer 6 interposed between the pixel substrate 2 and the counter substrate 3. The pixel substrate 2 includes a TFT substrate 21 as a circuit board, a plurality of pixel electrodes 22 provided in a matrix form above the TFT substrate 21, a plurality of touch detection electrodes TDL formed between the TFT substrate 21 and the pixel electrode 22, and an insulating layer 24 which insulates between the pixel electrode 22 and the touch detection electrodes TDL. The touch detection electrodes TDL serve as drive electrodes COML for the display function of the display device.

The counter substrate 3 which faces the pixel substrate 2 with the liquid crystal layer 6 interposed therebetween includes a color filter 32 provided on the liquid crystal layer 6 side of a glass substrate 31. The counter substrate 3 includes a polarizing plate 35 provided on the opposite side of the liquid crystal layer 6 in the glass substrate 31. The counter substrate 3 also includes drive electrodes COMLt between the glass substrate 31 and the polarizing plate 35. The drive electrodes COMLt face and intersect with the touch detection electrodes TDL provided on the pixel substrate 2 side with the liquid crystal layer 6 interposed therebetween. The drive electrodes COMLt correspond to the aforementioned drive electrodes Tx1 to Tx18 or the drive electrodes Txb1 to Txb23.

The respective drive electrodes COMLt are driven in a time division manner by a driving signal which is supplied in sequence. Change in capacitance between each of the drive electrodes COMLt and each of the touch detection electrodes TDL is detected in the touch detection electrodes TDL corresponding to proximity operation.

In the display device with a touch detection function 1e, the drive electrodes COMLt respectively have areas (overlapped areas) that overlap with at least one of the scanning signal lines and the pixel signal lines. By making the areas different from each other in accordance with the lengths of the wirings coupled with the COG 19, the same effect as those in the embodiments disclosed can be achieved. For example, as in the case of the display device with a touch detection function 1 of the first embodiment, the drive electrode COMLt arranged at the most distant position from the COG 19 is made to have an area smaller than the area of each of the other drive electrodes COMLt. As a result, it becomes possible to approximate the time constant in the drive electrode COMLt, which is arranged at the most distant position from the COG 19, to the time constant of the other drive electrodes COMLt. As in the display device with a touch detection function 1b of the second embodiment, the drive electrodes COMLt may be made to have areas smaller in stages in descending order of the length of the wiring coupled to the COG 19. Thus, when the areas of the drive electrodes COMLt are changed in stages, the time constant of the drive electrode COMLt arranged at the most distant position from the COG 19 can be approximated to the time constant of the other drive electrodes COMLt. The area of at least one of the scanning signal lines GCL and the pixel signal lines SGL, which overlap with the drive electrode COMLt arranged at the most distant position from the COG 19, may be made smaller (e.g., the wiring may be made thinner) than the scanning signal lines or the pixel signal lines corresponding to the other drive electrodes COMLt. Or alternatively, the drive electrode COMLt arranged at the most distant position from the COG 19 may have openings formed in the positions which overlap with at least one of the scanning signal lines and the pixel signal lines.

1-6 Sixth Embodiment

A description will now be given of a display device with a touch detection function 1f of a sixth embodiment of the present disclosure. The display device with a touch detection function in each of the aforementioned first to fifth embodiments is what is called an in-cell type display device with a touch detection function, in which part (or all) of the touch detection device 30 is integrally formed with part of the liquid crystal display devices 20. Contrary to this, the display device with a touch detection function 1f according to the sixth embodiment is what is called an on-cell type display device with a touch detection function, in which the touch detection device 30 is provided so as to be laid on the liquid crystal display unit 20. Except this point, the display device with a touch detection function 1f is similar in configuration to the display device with a touch detection function in each of the aforementioned first to fifth embodiments. Hereinafter, a description will be given while focused on characteristic aspects of the display device with a touch detection function 1f of the sixth embodiment.

Figure 25:
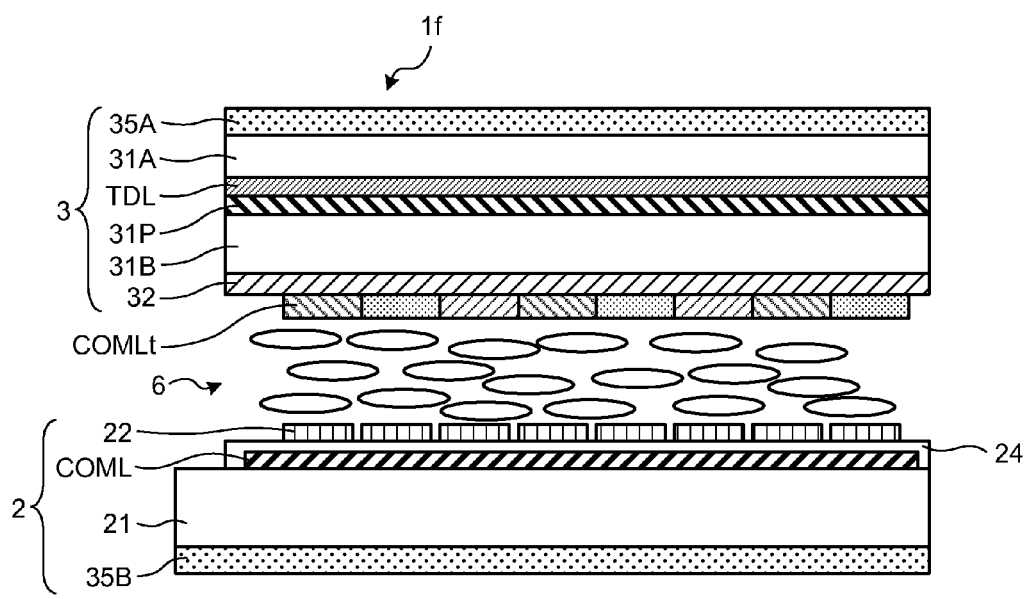
FIG. 25 is a cross sectional view illustrating a schematic cross sectional configuration of a display device with a touch detection function according to a sixth embodiment.

FIG. 25 is a cross sectional view illustrating a schematic cross sectional configuration of a principle part of the display device with a touch detection function according to the sixth embodiment. The display device with a touch detection function 1f illustrated in FIG. 25 includes a pixel substrate 2, a counter substrate 3 arranged so as to face the surface of the pixel substrate 2 in a direction perpendicular to the surface, and a liquid crystal layer 6 interposed between the pixel substrate 2 and the counter substrate 3. The pixel substrate 2 has a TFT substrate as a circuit board 2 and a polarizing plate 35B provided on the opposite side of the liquid crystal layer 6 in the TFT substrate 21. The pixel substrate 2 also includes a plurality of pixel electrodes 22 provided in a matrix form above the TFT substrate 21, a plurality of drive electrodes COML exclusively for the liquid crystal display unit 20 formed between the TFT substrate 21 and the pixel electrodes 22, and an insulating layer 24 which insulates between the pixel electrodes 22 and the plurality of drive electrodes COML exclusively for the liquid crystal display unit 20.

The counter substrate 3 which faces the pixel substrate 2 with the liquid crystal layer 6 interposed therebetween is formed from two glass substrates 31A and 31B which are joined with each other via an adhesive layer 31P. Between the adhesive layer 31P and the glass substrate 31A, a plurality of touch detection electrodes TDL are provided. A polarizing plate 35A is provided on the opposite side of the liquid crystal layer 6 in the glass substrate 31A. On the liquid crystal layer 6 side of the glass substrate 31B, a color filter 32 is provided. A plurality of drive electrodes COMLt are provided between the color filter 32 and the liquid crystal layer 6 so as to face and intersect with the touch detection electrodes TDL. The respective drive electrodes COMLt correspond to the aforementioned drive electrodes Tx1 to Tx18 or the drive electrodes Txb1 to Txb23.

The respective drive electrodes COMLt are driven in a time division manner by a driving signal which is supplied in sequence as in the display device with a touch detection function 1. Change in capacitance between each of the drive electrodes COMLt and each of the touch detection electrodes TDL is detected in the touch detection electrodes TDL corresponding to proximity operation.

In the display device with a touch detection function 1*f*, the drive electrodes COMLt respectively have areas (overlapped areas) which overlap with at least one of the scanning signal line and the pixel signal line. By making the areas different from each other in accordance with the length of the wiring coupled with the COG 19, the same effects as those in the embodiments disclosed can be achieved. For example, as in the case of the display device with a touch detection function 1 of the first embodiment, the drive electrode COMLt arranged at the most distant position from the COG 19 is made to have an area smaller than the area of each of the other drive electrodes COMLt. As a result, it becomes possible to approximate the time constant of the drive electrode COMLt, which is arranged at the most distant position from the COG 19, to the time constant of the other drive electrodes COMLt. As in the display device with a touch detection function 1*b* of the second embodiment, the drive electrodes COMLt may be made to have areas smaller in stages in descending order of the length of the wiring coupled to the COG 19. Thus, when the areas of the drive electrodes COMLt are changed in stages, the time constant of the drive electrode COMLt arranged at the most distant position from the COG 19 can be approximated to the time constant of the other drive electrodes COMLt. At least one of the scanning signal lines GCL and the pixel signal lines SGL that overlap with the drive electrode COMLt, which is arranged at the most distant position from the COG 19, may be made smaller in area (e.g., the wiring may be made thinner) than the scanning signal lines or the pixel signal lines corresponding to the other drive electrodes COMLt. Or alternatively, the drive electrode COMLt arranged at the most distant position from the COG 19 may have an opening formed in the positions which overlap with at least one of the scanning signal lines and the pixel signal lines.

1-7. Modifications

Although each of the embodiments to which the present disclosure is applied has been described in the foregoing, the present disclosure is not limited thereto, and various modifications are possible in addition to each of the embodiments disclosed.

For example, in each of the aforementioned embodiments, the drive electrodes COML are driven one by one in sequence so as to scan in the array direction. That is, a TSVCOM signal is applied only to one drive electrode COML. However, the present disclosure is not limited thereto. In the display devices with a touch detection function 1, 1*b* to 1*f*, a TSVCOM signal may simultaneously be applied to the plurality of drive electrodes COML. In this case, the drive electrodes COML to which the TSVCOM signal is to be applied are shifted in timing to calculate a difference. As a result, it becomes possible to detect the touch detection signals in a region corresponding to one drive electrode COML.

The display unit with a touch detection function 10 may also be configured by integrating the liquid crystal display unit 20, which uses liquid crystal in various modes including FFS and IPS modes, with the touch detection device 30.

Instead of the above configuration, the display unit with a touch detection function 10 may be formed by integrating liquid crystal of various modes, including a twisted nematic (TN), a vertical alignment (VA), and an electrically controlled birefringence (ECB), with a touch detection device. The display unit with a touch detection function 10 may also be formed with use of a transverse electric field-mode liquid crystal.

In the description of each embodiment, since the thickness of the display device with a touch detection function can be reduced, the display device with a touch detection function according to the present disclosure is configured as what is called an in-cell type apparatus, in which the liquid crystal display unit 20 and the capacitance-type touch detection device 30 are integrated. However, instead of the device disclosed, the display device may be formed by, for example, mounting a capacitance-type touch detection device on a liquid crystal display device. Moreover, in each of the first to sixth embodiments, the present disclosure has been described with the display devices with a touch detection function 1, 1*b* to 1*f* as embodiments. However, the present disclosure may be applied to a touch detection device which does not include a liquid crystal display device (display device).

2. Application Examples

A description will now be given of application examples of the display devices with a touch detection function 1, 1*b* to 1*f* described in each of the embodiments with reference to FIGS. 26 to 32. FIGS. 26 to 32 illustrate examples of electronic apparatuses to which the display devices with a touch detection function according to the embodiments is applied. The display devices with a touch detection function 1, 1*b* to 1*f* according to the first to sixth embodiments may be applied to electronic apparatuses in any field, including TV apparatuses, digital cameras, note-type personal computers, mobile devices such as mobile phones, and video cameras. In other words, the display devices with a touch detection function 1, 1*b* to 1*f* according to the first to sixth embodiments are applicable to electronic apparatuses in any field which display video signals inputted from the outside or video signals generated in the inside as images or pictures.

Application Example 1

Figure 26:
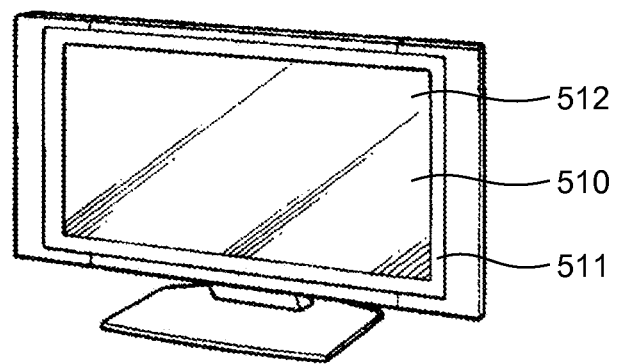
FIG. 26 illustrates one example of electronic apparatuses to which the display device with a touch detection function according to any one of the embodiments is applied.

An electronic apparatus illustrated in FIG. 26 is a TV apparatus to which any one of the display devices with a touch detection function 1, 1*b* to 1*f* according to the first to sixth embodiments is applied. For example, the TV apparatus has a picture display screen unit 510 including a front panel 511 and a filter glass 512. The picture display screen unit 510 is any one of the display devices with a touch detection function 1, 1*b* to 1*f* according to the first to sixth embodiments.

Application Example 2

Figure 27:
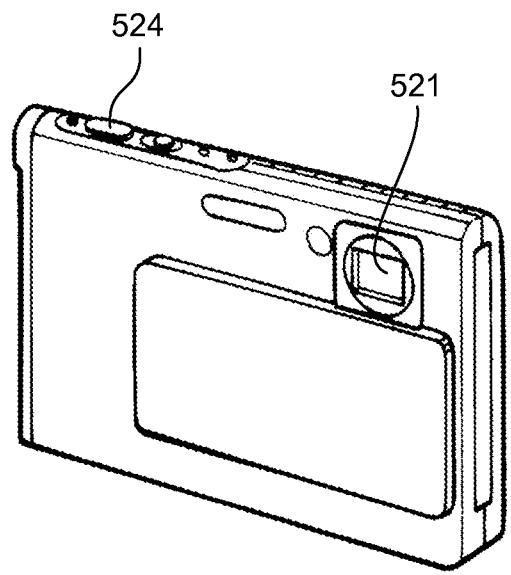
FIG. 27 illustrates one example of electronic apparatuses to which the display device with a touch detection function according to any one of the embodiments is applied.
Figure 28:
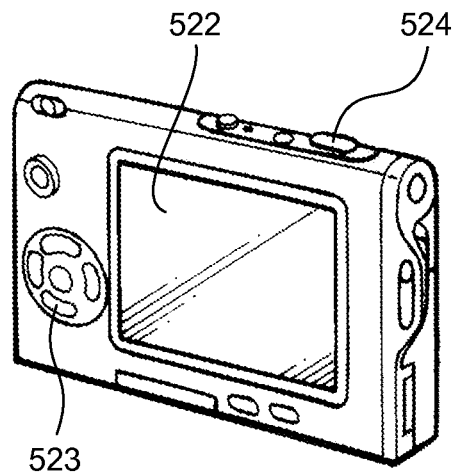
FIG. 28 illustrates one example of electronic apparatuses to which the display device with a touch detection function according to any one of the embodiments is applied.

An electronic apparatus illustrated in FIGS. 27 and 28 is a digital camera to which any one of the display devices with a touch detection function 1, 1*b* to 1*f* according to the first to sixth embodiments is applied. For examples, the digital camera includes a flash light emission unit 521, a display unit 522, a menu switch 523, and a shutter release button 524. The display unit 522 is any one of the display devices with a touch detection function 1, 1*b* to 1*f* according to the first to sixth embodiments.

Application Example 3

Figure 29:
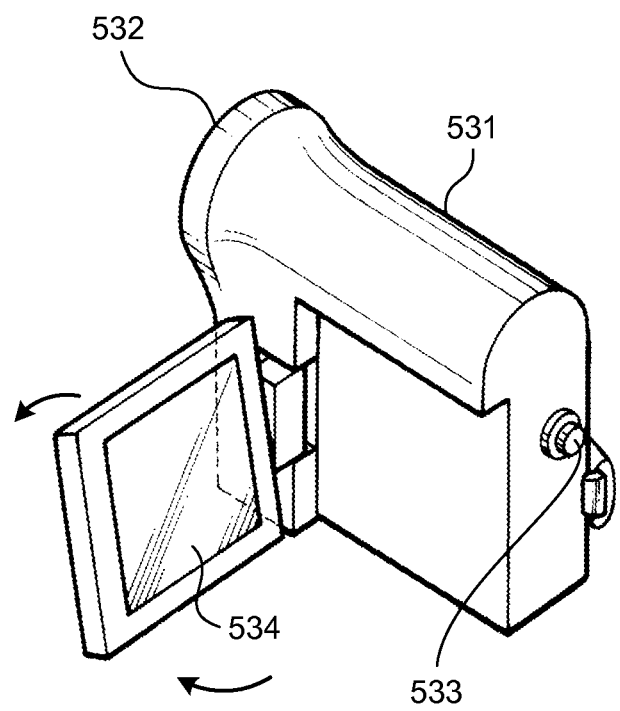
FIG. 29 illustrates one example of electronic apparatuses to which the display device with a touch detection function according to any one of the embodiments is applied.

FIG. 29 illustrates an external appearance of a video camera as an electronic apparatus to which any one of the display devices with a touch detection function 1, 1*b* to 1*f* according to the first to sixth embodiments is applied. For example, the video camera includes a main body unit 531, a subject photographing lens 532 provided on a front lateral surface of the main body unit 531, a start/stop switch 533 for photographing, and a display unit 534. The display unit 534 is any one of the display devices with a touch detection function 1, 1*b* to 1*f* according to the first to sixth embodiments.

Application Example 4

Figure 30:
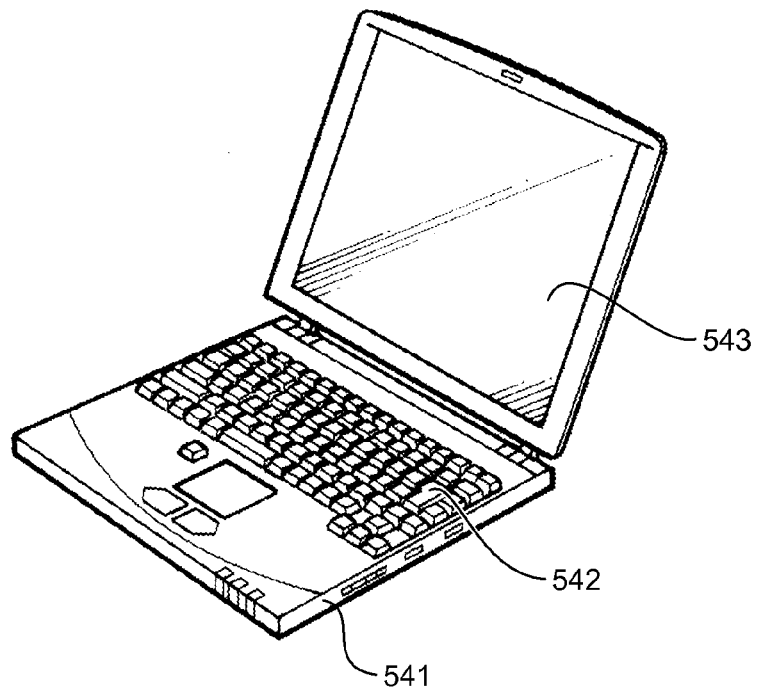
FIG. 30 illustrates one example of electronic apparatuses to which the display device with a touch detection function according to any one of the embodiments is applied.

An electronic apparatus illustrated in FIG. 30 is a note-type personal computer to which any one of the display devices with a touch detection function 1, 1*b* to 1*f* according to the first to sixth embodiments is applied. For example, the note-type personal computer include a main body 541, a keyboard 542 for inputting texts and the like, and a display unit 543 for displaying images. The display unit 543 is any one of the display devices with a touch detection function 1, 1*b* to 1*f* according to the first to sixth embodiments.

Application Example 5

Figure 31:
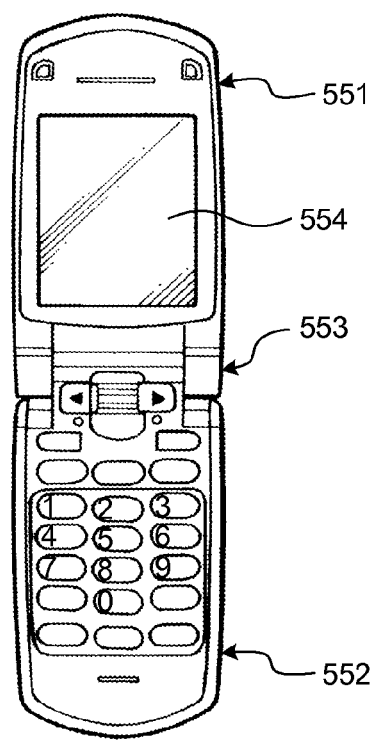
FIG. 31 illustrates one example of electronic apparatuses to which the display device with a touch detection function according to any one of the embodiments is applied.

An electronic apparatus illustrated in FIG. 31 is a portable telephone device to which any one of the display devices with a touch detection function 1, 1*b* to 1*f* according to the first to sixth embodiments is applied. For example, the portable telephone device is made by connecting an upper housing 551 and a lower housing 552 with use of a connection unit (a hinge unit) 553. The portable telephone device includes a display device 554. The display device 554 is any one of the display devices with a touch detection function 1, 1*b* to 1*f* according to the first to sixth embodiments.

Application Example 6

Figure 32:
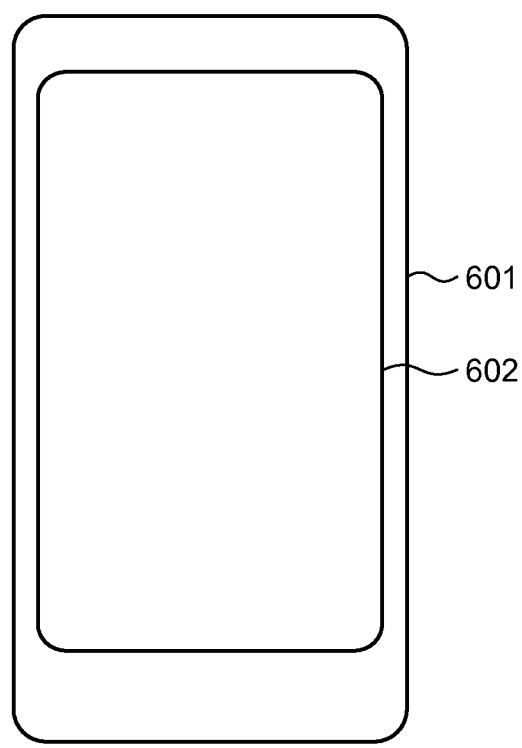
FIG. 32 illustrates one example of electronic apparatuses to which the display device with a touch detection function according to any one of the embodiments is applied.

An electronic apparatus illustrated in FIG. 32 is a portable telephone device that is so-called a smartphone to which any one of the display devices with a touch detection function 1, 1*b* to 1*f* according to the first to sixth embodiments is applied. For example, the portable telephone device has a touch panel 602 on a surface portion of a thin plate-like casing 601 having substantially a rectangular shape. The touch panel 602 is any one of the display devices with a touch detection function 1, 1*b* to 1*f* according to the first to sixth embodiments.

3. Aspects of Present Disclosure

The present disclosure includes the following aspects.

(1) A touch detection device that is configured to be stacked on a display device, which has a plurality of scanning signal lines and a plurality of pixel signal lines and displays an image on a display area, and to detect a position of an external proximity object which is in contact with or in proximity to a detection surface, the touch detection device comprising:

a drive electrode layer that has a plurality of drive electrodes each arranged at a position that overlaps with at least one of the scanning signal lines and the pixel signal lines in a direction orthogonal to the detection surface;

a plurality of touch detection electrodes that face the drive electrodes to form capacitance between the drive electrodes and the touch detection electrodes;

a drive electrode driver for applying a driving signal to the drive electrodes; and a plurality of wirings for electrically coupling the plurality of drive electrodes with the drive circuit, wherein in the drive electrode layer, among the plurality of drive electrodes, a specific drive electrode coupled via the wiring with a longest distance has an overlapped area smaller than an average of the overlapped areas of the other drive electrodes, the overlapped area being an area that is overlapped with at least one of the scanning signal lines and the pixel signal lines.

(2) The touch detection device according to (1), wherein the specific drive electrode is smallest in area among the drive electrodes.

(3) The touch detection device according to (1), wherein among the plurality of drive electrode, the specific drive electrode is arranged at a most distant position from the drive electrode driver.

(4) The touch detection device according to (1), wherein in the drive electrode layer, the plurality of drive electrodes are arranged so as to be adjacent to each other in an array direction and are symmetric with respect to a center in the array direction.

(5) The touch detection device according to (1), wherein in the drive electrode layer, among the plurality of drive electrodes, the drive electrode has the overlapped area equal to or less than the overlapped areas of the drive electrodes coupled via the wirings with shorter distances, with the areas of the drive electrodes being changed in a plurality of stages.

(6) A display device with a touch detection function having a display area for displaying an image and a detection surface for detecting a position of an external proximity object which is in contact therewith or in proximity thereto, the display device with a touch detection function comprising:

a plurality of scanning signal lines for supplying a scanning signal to the display area;

a plurality of pixel signal lines for supplying a pixel signal to the display area;

a drive electrode layer that has a plurality of drive electrodes each arranged at a position that overlaps with at least one of the scanning signal lines and the pixel signal lines in a direction orthogonal to the detection surface;

a plurality of touch detection electrodes that face the drive electrodes to form capacitance between the drive electrodes and the touch detection electrodes;
a drive electrode driver for applying a driving signal to the drive electrodes; and
a plurality of wirings for electrically coupling the plurality of drive electrodes with the drive circuit, wherein
in the drive electrode layer, among the plurality of drive electrodes, a specific drive electrode coupled via the wiring with a longest distance has an overlapped area smaller than an average of the overlapped areas of the other drive electrodes, the overlapped area being an area that is overlapped with at least one of the scanning signal lines and the pixel signal lines.

(7) The display device with a touch detection function according to (6), further comprising:
a plurality of pixel electrodes that are arranged in the display area so as to face the drive electrode layer and each of which is coupled to one of the scanning signal lines and one of the pixel signal lines;
a display function layer that is arranged so as to face the pixel electrodes and has an image display function for displaying the image; and
a control unit that performs image display control based on a video signal so as to cause the image display function of the display function layer to be implemented by supplying the pixel signal to each of the pixel electrodes via the pixel signal lines and applying a display drive voltage to the drive electrodes.

(8) The display device with a touch detection function according to (7), wherein in the drive electrode layer, the plurality of drive electrodes are arranged so as to be adjacent to each other in an array direction and a length of each of the drive electrodes in the array direction is an integer multiple of a pixel pitch that is an arrangement interval of the pixel electrodes in the display area.

(9) The display device with a touch detection function according to (7), wherein an area at least one of the scanning signal lines and the pixel signal lines at a position overlapped with the specific drive electrode is smaller in area than the scanning signal lines or the pixel signal lines at a position overlapped with the other drive electrodes.

(10) The display device with a touch detection function according to (6), wherein the specific drive electrode has an opening provided at a position overlapped with at least one of the scanning signal lines and the pixel signal lines.

(11) An electronic apparatus, comprising the display device with a touch detection function according to (6).

According to the present disclosure, among a plurality of drive electrodes, a specific drive electrode coupled via the wiring having a longest distance is made to have an area smaller than an average area of the other drive electrodes. As a result, it becomes possible to decrease a difference in time constant between the drive electrode which is distant from the drive circuit, i.e., which has a long-distance wiring, and the other drive electrodes. This makes it possible to equalize the time taken for attaining a touch detectable state of a specified level. Therefore, touch detection time in each drive electrode can be shortened while the touch detection accuracy can be maintained.

One embodiment of the present disclosure can decrease a difference in time constant between the drive electrode distant from the drive circuit and the other drive electrodes and can also equalize the time taken for attaining a touch detectable state of a specified level. Therefore, touch detection time in each drive electrode can be shortened while the touch detection accuracy can be maintained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function, comprising:
a display area for displaying an image;
a detection surface for detecting a position of an external proximity object which is in contact therewith or in proximity thereto;
a plurality of scanning signal lines for supplying a scanning signal to the display area;
a plurality of pixel signal lines for supplying a pixel signal to the display area;
a drive electrode layer that has a plurality of drive electrodes each arranged at a position that overlaps with at least one of the scanning signal lines and the pixel signal lines in a direction orthogonal to the detection surface;
a drive electrode driver for applying a driving signal to the drive electrodes; and
a plurality of wirings for electrically coupling the plurality of drive electrodes with the drive circuit,
wherein each of the drive electrodes has an opening provided at a position overlapped with at least one of the scanning signal lines and the pixel signal lines, and
wherein an opening area of the opening of a first drive electrode that is coupled via a longest wiring with the drive electrode driver is larger than opening areas of the drive electrodes other than the first drive electrode.

2. The display device with a touch detection function according to claim 1, wherein
the drive electrodes are arranged adjacent to each other in an arrangement direction of the drive electrodes, and
at least three drive electrodes of the drive electrodes are different in size from each other.

3. The display device with a touch detection function according to claim 1, wherein
the drive electrodes are arranged adjacent to each other in an arrangement direction of the drive electrodes, and
at least three drive electrodes of the drive electrodes are different in length in the arrangement direction from each other.

4. The display device with a touch detection function according to claim 1, further comprising:
a plurality of pixel electrodes that are arranged in the display area so as to face the drive electrode layer and each of which is coupled to one of the scanning signal lines and one of the pixel signal lines;
a display function layer that is arranged so as to face the pixel electrodes and has an image display function for displaying the image; and
a control unit that performs image display control based on a video signal so as to cause the image display function of the display function layer to be implemented by supplying the pixel signal to each of the pixel electrodes via the pixel signal lines and applying a display drive voltage to the drive electrodes.

5. The display device with a touch detection function according to claim 4, wherein in the drive electrode layer, the plurality of drive electrodes are arranged so as to be adjacent to each other in an array direction and a length of each of the drive electrodes in the array direction is an integer multiple of a pixel pitch that is an arrangement interval of the pixel electrodes in the display area.

6. An electronic apparatus, comprising the display device with a touch detection function according to claim 1.

7. The display device with a touch detection function according to claim 1, wherein the first drive electrode has a smallest size among the drive electrodes.

8. The display device with a touch detection function according to claim 1, wherein among the drive electrodes, the first drive electrode is arranged at a position farthest from the drive electrode driver.

9. The display device with a touch detection function according to claim 1, wherein in the drive electrode layer, the plurality of drive electrodes are arranged so as to be adjacent to each other in an array direction and are symmetric with respect to a center in the array direction.

10. The display device with a touch detection function according to claim 1, wherein in the drive electrode layer, among the drive electrodes, a drive electrode has the overlapped area equal to or less than the overlapped areas of the drive electrodes coupled via the wirings with shorter distances, with the overlapped areas of the drive electrodes being changed in a plurality of stages.

11. The display device with a touch detection function according to claim 1, wherein a width of at least one of the scanning signal lines and the pixel signal lines at a position overlapped with the first drive electrode is smaller than a width of at least one of the scanning signal lines or the pixel signal lines at a position overlapped with the drive electrodes other than the first drive electrode.

12. The display device with a touch detection function according to claim 1, wherein the opening includes a first opening area that overlaps both of one of the scanning lines and one of the pixel signal lines.

13. The display device with a touch detection function according to claim 1, wherein the opening include a second opening area that overlaps one of the pixel signal lines without overlapping the scanning lines.

14. The display device with a touch detection function according to claim 1, wherein
the opening includes a first opening area and a second opening area,
the first opening area overlaps both of one of the scanning lines and one of the pixel signal lines,
the second opening area overlaps one of the pixel signal lines without overlapping the scanning lines, and
the first opening area is separated from the second opening area.

15. The display device with a touch detection function according to claim 1, further comprising a plurality of pixels arranged in the display area,
wherein, in each of the pixels the opening partly overlaps at least one of the scanning signal lines and the pixel signal lines.

16. The display device with a touch detection function according to claim 1, further comprising a plurality of pixels arranged in the display area,
wherein the opening is arranged at an end of each of the pixels in a direction along the pixel signal lines.

17. The display device with a touch detection function according to claim 1, further comprising a plurality of pixels arranged in the display area,
wherein, each of the pixels includes
a first pixel area in which one of the pixel signal lines overlaps the opening and
a second pixel area in which one of the pixel signal lines does not overlap the opening.

18. The display device with a touch detection function according to claim 17, wherein the second pixel area is in a center area of each of the pixels.

* * * * *